United States Patent
Makino et al.

(10) Patent No.: US 8,361,681 B2
(45) Date of Patent: Jan. 29, 2013

(54) POLYMERIZABLE COMPOSITIONS, COLOR FILTERS, PRODUCTION METHODS THEREOF, AND SOLID-STATE IMAGING DEVICES

(75) Inventors: Masaomi Makino, Haibara-gun (JP); Tomotaka Tsuchimura, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 198 days.

(21) Appl. No.: 12/934,934

(22) PCT Filed: Feb. 23, 2009

(86) PCT No.: PCT/JP2009/053169
§ 371 (c)(1), (2), (4) Date: Sep. 27, 2010

(87) PCT Pub. No.: WO2009/119218
PCT Pub. Date: Oct. 1, 2009

(65) Prior Publication Data
US 2011/0025891 A1 Feb. 3, 2011

(30) Foreign Application Priority Data
Mar. 28, 2008 (JP) .................. 2008-088054

(51) Int. Cl.
*G02B 5/20* (2006.01)
(52) U.S. Cl. ....... 430/7; 430/270.1; 430/286.1; 257/440
(58) Field of Classification Search .................. None
See application file for complete search history.

(56) References Cited

U.S. PATENT DOCUMENTS

| | | | |
|---|---|---|---|
| 3,558,309 A | 1/1971 | Laridon et al. | |
| 4,255,513 A | 3/1981 | Laridon et al. | |
| 4,590,145 A | 5/1986 | Itoh et al. | |
| 6,703,182 B1 * | 3/2004 | Birbaum et al. | 430/270.1 |
| 6,949,678 B2 | 9/2005 | Kunimoto et al. | |
| 2001/0012596 A1 | 8/2001 | Kunimoto et al. | |
| 2007/0072096 A1 | 3/2007 | Takakuwa et al. | |
| 2007/0128548 A1 | 6/2007 | Kim et al. | |
| 2007/0203255 A1 * | 8/2007 | Sasaki | 522/49 |
| 2009/0023085 A1 | 1/2009 | Tsuchimura | |
| 2010/0104976 A1 | 4/2010 | Sasaki | |

FOREIGN PATENT DOCUMENTS

| | | |
|---|---|---|
| CN | 1805955 A | 7/2006 |
| CN | 101024624 A | 8/2007 |
| DE | 10 061 947 A1 | 6/2001 |
| EP | 0 009 832 A2 | 4/1980 |
| EP | 0 724 197 A1 | 7/1996 |
| EP | 1 635 220 A2 | 3/2006 |
| EP | 1 826 200 A2 | 8/2007 |
| EP | 1 887 425 A1 | 2/2008 |
| JP | 09-062001 A | 3/1997 |
| JP | 2000-80068 A | 3/2000 |
| JP | 2000-314956 A | 11/2000 |
| JP | 2001-233842 A | 8/2001 |
| JP | 2005-202252 A | 7/2005 |
| JP | 2006-72134 A | 3/2006 |
| JP | 2006-195425 A | 7/2006 |
| JP | 2007-108629 A | 4/2007 |
| JP | 2007-119686 A | 5/2007 |
| JP | 2008-65040 A | 3/2008 |
| JP | 2008-89732 A | 4/2008 |
| WO | WO 2006/059458 A1 | 6/2006 |
| WO | WO 2007/147782 A2 * | 12/2007 |
| WO | WO 2008/032652 A1 | 3/2008 |

OTHER PUBLICATIONS

First Office Action, dated Feb. 22, 2012, issued in corresponding CN Application No. 200980110850.4, 9 pages in English and Chinese.
The Second Office Action, dated Oct. 23, 2012; issued in corresponding CN Application No. 200980110850.4, 15 pages in Chinese and English.

* cited by examiner

*Primary Examiner* — John A. McPherson
(74) *Attorney, Agent, or Firm* — Sughrue Mion, PLLC

(57) ABSTRACT

Disclosed is a polymerizable composition characterized by containing at least (A) a photopolymerization initiator represented by the following general formula (1); (B) a coloring agent; (C) a polymerizable monomer; (D) a binder polymer; and (E) a solvent.

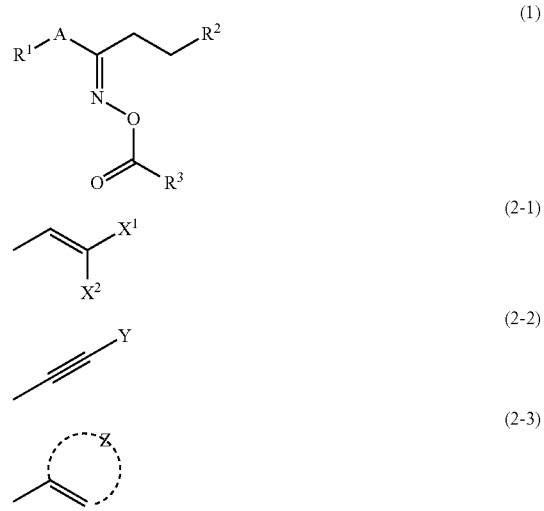

wherein, in formula (1), $R^1$ represents an aromatic group; $R^2$ represents a group represented by any one of the above Formulae (2-1) to (2-3); $R^3$ represents an alkyl group or the like; and A represents a single bond or —C(=O)—; $X^1$, $X^2$, and Y each independently represent a hydrogen atom, an alkyl group or the like and Z represents an atomic group which may form an arbitrary ring structure containing a carbon-carbon double bond.

11 Claims, No Drawings

POLYMERIZABLE COMPOSITIONS, COLOR FILTERS, PRODUCTION METHODS THEREOF, AND SOLID-STATE IMAGING DEVICES

FIELD OF THE INVENTION

The present invention relates to polymerizable compositions, color filters, production methods thereof, and solid-state imaging devices.

DESCRIPTION OF RELATED ART

Polymerizable compositions may include, for example, an ethylenic unsaturated bond-containing polymerizable compound and a photopolymerization initiator. Such polymerizable compositions are cured through polymerization when they are irradiated with light, and are therefore used for, for example, photosetting inks, photosensitive printing plates, color filters, and a variety of photoresists.

In other types of polymerizable compositions, for example, an acid is generated upon irradiation of light, and the acid functions as a catalyst. Specifically, such compositions may be used in materials for image formation, anti-counterfeiting or detection of energy-ray dose, in which a chromogenic reaction of a dye precursor in the presence of the generated acid acting as a catalyst is used, or may be used for positive resists for use in manufacture of semiconductors, TFTs, color filters, micromachine components, and the like, in which a decomposition reaction in the presence of the generated acid acting as a catalyst is used.

In recent years, photosensitive or photopolymerizable compositions sensitive to shorter wavelength (365 nm or 405 nm) light sources have been demanded in various applications, and demands for such compounds (e.g. photopolymerization initiators) capable of exhibiting high sensitivity to such short wavelength light sources have been increasing. However, highly sensitive photopolymerization initiators are generally poor in stability. Therefore, there is a demand for photopolymerization initiators having both of improved sensitivity and stability over time.

Under the circumstances, it is proposed to use oxime ester derivatives as photopolymerization initiators for polymerizable compositions, for example in U.S. Pat. Nos. 4,255,513 and 4,590,145 and Japanese Patent Application Laid-Open (JP-A) Nos. 2000-80068 and 2001-233842. However, these known oxime ester compounds have low absorbance at a wavelength of 365 nm or 405 nm and are not satisfactory in terms of sensitivity.

At present, there has been a demand for polymerizable compositions having not only high stability over time but also high sensitivity to light with a short wavelength such as 365 nm or 405 nm.

For example, JP-A No. 2000-314956 discloses a colored radiation-sensitive composition for color filters that contains an oxime compound. However, the stability over time and short-wavelength sensitivity of such a composition is still insufficient. Further, with respect to the colored radiation-sensitive composition, there is a new demand for improving reproducibility of hue after pattern formation, and suppression of change in coloring property over time is strongly demanded.

Meanwhile, with respect to a color filter for image sensor, there is a demand for a high color concentration of the color filter and a thinned color filter, in order to enhance the light-gathering power of solid-state imaging devices such as CCDs and in order to improve the image quality by improving color-separation properties. If a large amount of a coloring material is added to achieve a high color concentration, the sensitivity may be insufficient for faithful reproduction of the shape of a fine pixel pattern of 2.5 μm or less, so that pattern defects can frequently occur over the product. In order to avoid such defects, photo-irradiation has to be performed with higher energy, which requires a long exposure time and leads to a significant reduction in manufacturing yield. Under the circumstances, there is a demand for colored radiation-sensitive compositions for color filters having a high content of a coloring material (colorant) and also having high sensitivity in order to achieve excellent pattern forming property.

DISCLOSURE OF INVENTION

Means for Solving Problem(s)

It is an object of the present invention to provide a polymerizable composition having high sensitivity to light with a wavelength of 365 nm or 405 nm and having high stability over time, and also capable of forming a cured film that is able to suppress discoloration due to heating with time.

A second object of the present invention is to provide a color filter provided with a color pattern in which a pattern shape is good, adhesion to a support is excellent, and discoloration due to heating with time is suppressed, and a method for manufacturing a color filter with high productivity, and a solid-state imaging device equipped with the color filter.

Means for Solving Problem(s)

The present inventors have made repeatedly extensive investigations, and as a result, they found that by using an oxime compound having a double bond or a triple bond at specific position, both good absorbance for the light of wavelength of 365 nm or 405 nm and excellent stability over time are exhibited, and a coloring due to heating with time can be suppressed. The specific means for addressing the above problems is described as follows.

The specific means for achieving the above problem is as follows.

<1> A polymerizable composition including at least, (A) a photopolymerization initiator represented by the following general formula (1), (B) a coloring agent, (C) a polymerizable monomer, (D) a binder polymer, and (E) a solvent.

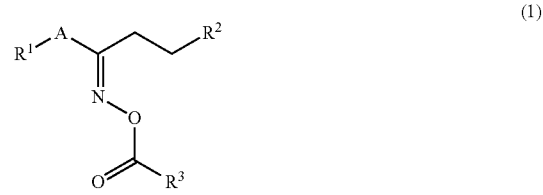

(1)

(2-1)

(2-2)

(2-3)

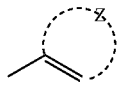

In general formula (1), R¹ represents an aromatic group, R² represents a group represented by any one of the above general formulae (2-1) to (2-3), R³ represents an alkyl group having 1 to 5 carbon atoms or an aryl group, and A represents a single bond or —C(=O)—. Further, among the general formulae (2-1) to (2-3), X¹, X², and Y each independently represent a hydrogen atom, an alkyl group, or an aryl group and Z represents an atomic group which may form an arbitrary ring structure containing a carbon-carbon double bond.

A color filter provided with a colored pattern formed on or above a support by using the polymerizable composition described in the above <1>.

Method for producing a color filter, the method including:
forming a polymerizable composition layer by applying the polymerizable composition described in the above <1> on or above a support,
exposing the polymerizable composition layer via a mask, and
forming a colored pattern by developing the polymerizable composition layer after exposure.

A solid-state imaging device equipped with the color filter.

Effect of Invention

According to the present invention, it is possible to provide a polymerizable composition having high sensitivity to light with a wavelength of 365 nm or 405 nm and having high stability over time, and also capable of forming a cured film that is able to suppress discoloration due to heating with time.

Also, according to the present invention, a color filter provided with a colored pattern, in which a pattern shape is good, an adhesion to a support is excellent, and a discoloration due to heating with time can be suppressed, and a method capable of producing for the color filter with high productivity, and a solid-state imaging device equipped with the color filter are provided.

BEST MODE FOR CARRYING OUT THE INVENTION

A polymerizable composition, a color filter, a method for producing the color filter and a solid-state imaging device of the present invention are explained in more detail.
<Polymerizable Composition>
A polymerizable composition of the present invention includes at least, (A) a photopolymerization initiator represented by the general formula (1), (B) a coloring agent, (C) a polymerizable monomer, (D) a binder polymer, and (E) a solvent.

Hereinafter, respective components (A) to (E) which constitute a polymerizable composition of the present invention, is explained in order.
<(A) Photopolymerization Initiator represented by the General Formula (1)>
The polymerizable composition of the present invention includes a photopolymerization initiator represented by following general formula (1). Hereinafter, this photopolymerization initiator is referred to suitably as "a specific oxime compound" to explain the photopolymerization initiator.

(1)

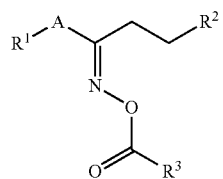

In the general formula (1), R¹ represents an aromatic group, R² represents a group represented by any one of the following general formula (2-1) to (2-3), R³ represents an alkyl group having 1 to 5 carbon atoms or an aryl group and A represents a single bond or —C(=O)—.

In the general formula (1), as for the aromatic group represented by R¹, examples of the aromatic group include a phenyl group, a naphthyl group, anthranyl group, pyridinyl group, thiophenyl group, carbazoyl group, and, a group represented by the following general formula (3), or the like.

Among them, from the point of improving absorbance index in wavelength of 365 nm, the group represented by the following general formula (3) is preferable.

(3)

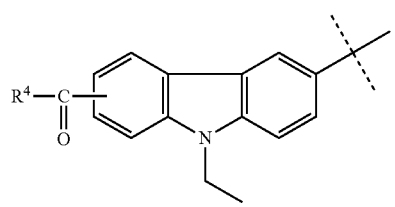

In the general formula (3), R⁴ represents an aromatic group. As for the aromatic group represented by R⁴, examples of the aromatic group include a phenyl group, a naphthyl group, an anthranyl group, a pyridinyl group, a thio phenyl group, a tolyl group, a 4-bromophenyl group, a 4-fluorophenyl group, a 4-iodophenyl group, a 4-morpholinophenyl group, a 4-diethylaminophenyl group, and a 4-methoxy phenyl group. Among them, from the point of improving absorbance index in wavelength of 365 nm, the tolyl group, and the 4-bromophenyl group are preferable.

In the general formula (1), R² represents a group represented by one of the following general formulae (2-1) to (2-3).

(2-1)

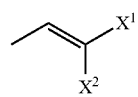

(2-2)

(2-3)

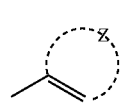

In the general formulas (2-1) to (2-3), X¹, X², and Y each independently represents a hydrogen atom, an alkyl group, or an aromatic group, Z represents an atomic group which may forms an arbitrary ring structure, including a carbon-carbon double bond.

As for the alkyl group represented by the above $X^1$, $X^2$, and Y, an alkyl group having 1 to 10 carbon atoms is preferable, and an alkyl group having 1 to 5 carbon atoms is more preferable. Specific examples of the alkyl group include a methyl group, an ethyl group, propyl group, an isopropyl group, a butyl group, an isobutyl group, a pentyl group, and a hexyl group. Among them, from the point of improvement of the storage stability of a specific oxime compound itself, a methyl group is preferable.

As for the aromatic group represented by the above $X^1$, $X^2$, and Y, examples of the aromatic group include a phenyl group, a naphthyl group, an anthranyl group, a pyridinyl group, a thio phenyl group, and a tolyl group. Among them, from the point of improving storage stability of the specific oxime compound itself, a phenyl group is preferable.

In addition, as for the alkyl group or the aromatic group represented by the $X^1$, $X^2$, and Y, these may have further a substituent. As for the substituent that may be introduced, examples of the substituent include a methoxy group, an ethoxy group, a methoxycarbonyl group, an ethoxycarbonyl group, a diethyl amino group, a morpholino group, a methylthio group, an ethylthio group, a phenylthio group, a methylcarbonyloxy group, and a sulfonyl group.

Further, as for the arbitrary ring structure including a carbon-carbon double bond formed by using an atomic group represented by the above Z, examples of the arbitrary ring structure include a benzene ring, a cyclohexene ring, a naphthalene ring, an anthracene ring, an indene ring, and an indenone ring. Among them, from the point of improvement of sensitivity of the specific oxime compound itself, a benzene ring and a cyclohexene ring are preferable.

In the general formula (1), as for the alkyl group having 1 to 5 carbon atoms, represented by $R^3$, examples of the alkyl group includes a methyl group, an ethyl group, a propyl group, a butyl group, an isopropyl group, a butyl group, an isobutyl group, and a pentyl group. These alkyl groups may have further a substituent. As for the substituent that may be introduced, examples of the substituent include a methoxy group, an ethoxy group, an acetal group, a silyl group, a cyano group, a methoxycarbonyl group, and an ethoxycarbonyl group.

In the general formula (1), as for the aryl group represented by $R^3$, examples of the aryl group include a phenyl group and a naphthyl group. The phenyl group thereof may have further a substituent. As for the substituent that may be introduced, examples of the substituent include a methoxy group, an ethoxy group, an acetal group, a silyl group, a cyano group, a methoxycarbonyl group, and an ethoxycarbonyl group.

Even among them, from the point of high sensitization, as for the $R^3$, an alkyl group is preferable, and specifically, a methyl group, an ethyl group, a propyl group, and an isopropyl group are preferable.

In the above general formula (1), A represents a single bond or —C(=O)—. From the point of more improving sensitivity, A is preferably —C(=O)—.

A polymerization initiator represented by the general formula (1) can be synthesized as follows.

For example, it is possible to use a method in which an acetyl group is bound to an aromatic group represented by $R^1$ by using a Friedel-Crafts reaction and an alkylation is carried out using a halide compound having corresponding double bond or triple bond in the presence of alkali. Herein, in a case in which A is a single bond, a hydroxylamine can be reacted to obtain an oxime compound. Further, in a case in which A is —(C=O)—, an oxime compound can be obtained by using a sodium methoxide and isopentyl nitrite.

A specific examples of a specific oxime compound [exemplified compounds (A-1) to (A-36)] of the present invention are described below, but the present invention is not limited to these compounds.

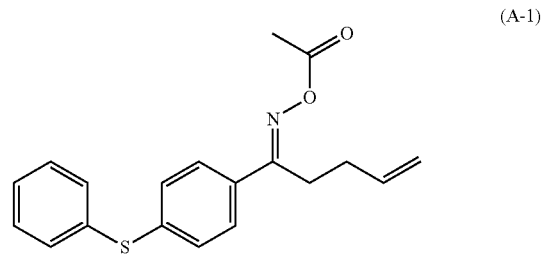

(A-1)

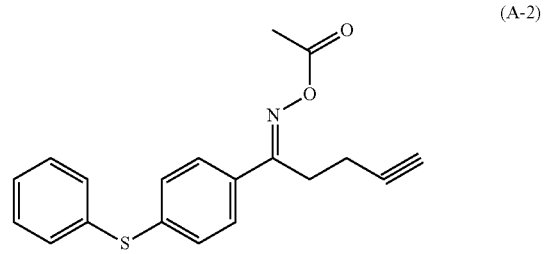

(A-2)

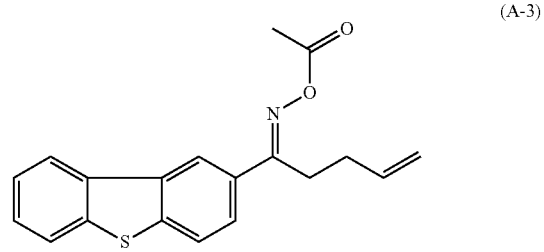

(A-3)

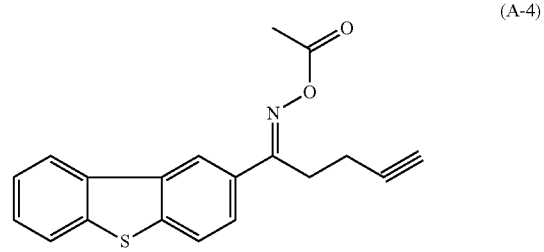

(A-4)

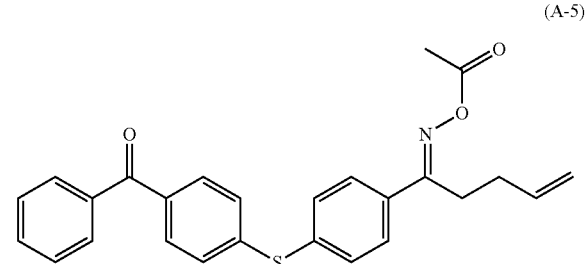

(A-5)

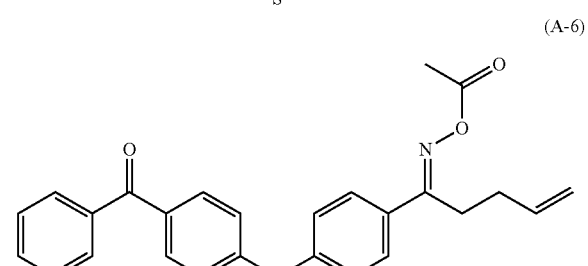

(A-6)

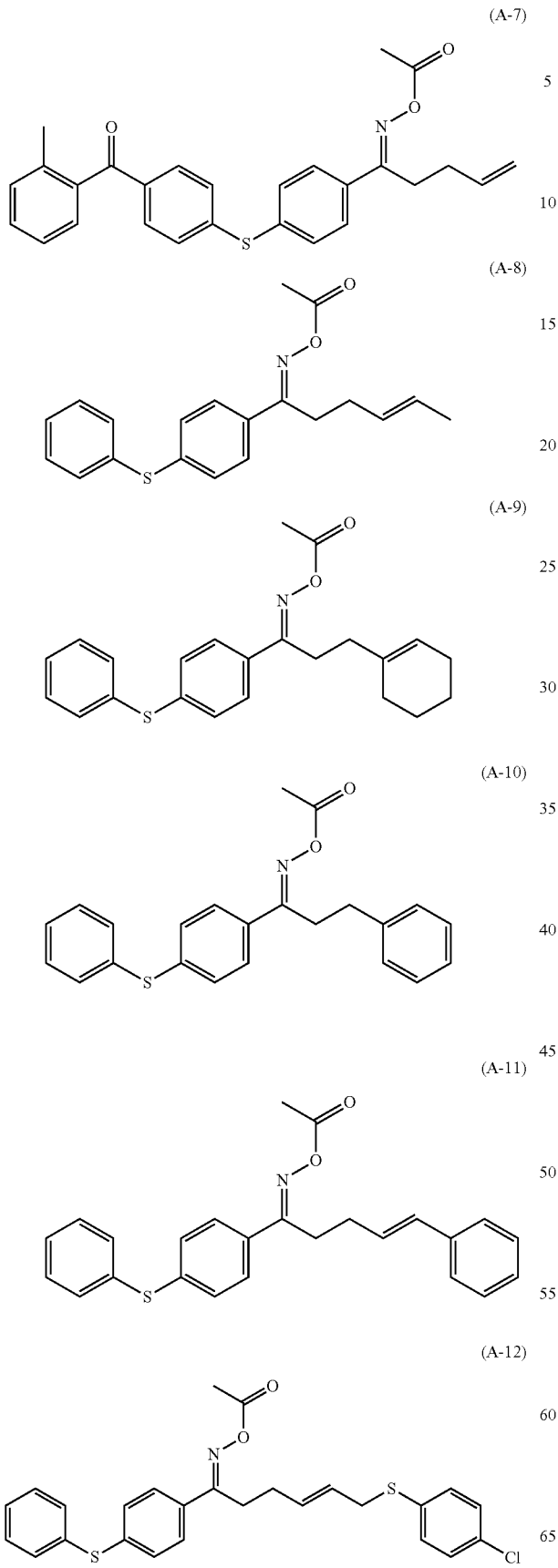
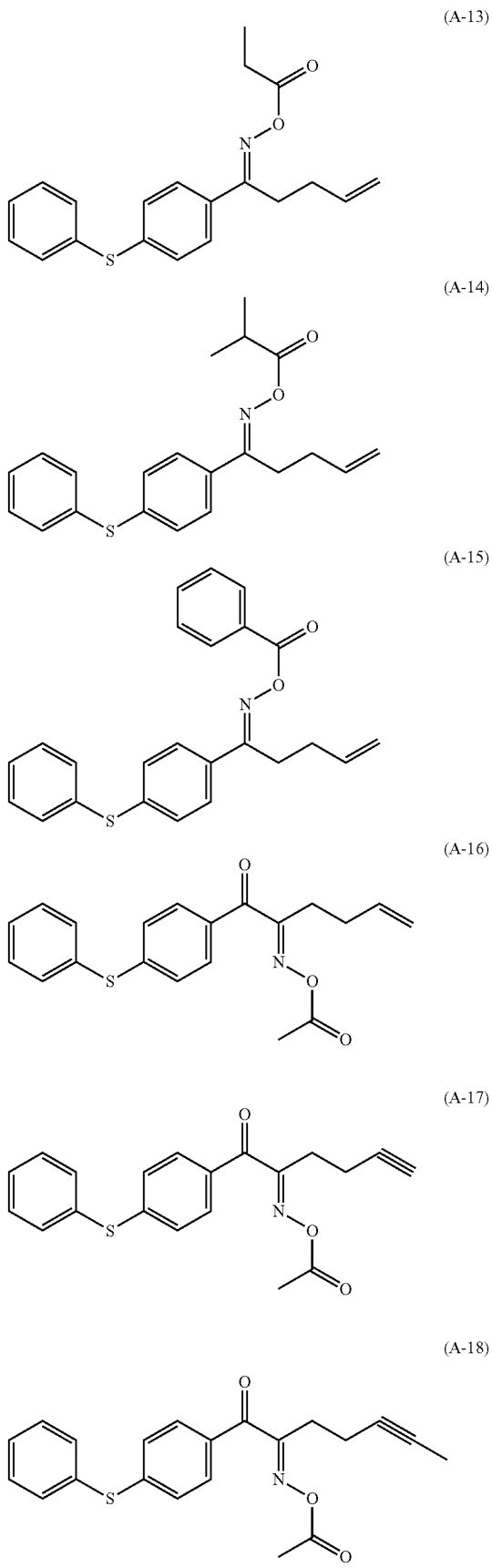

(A-19)
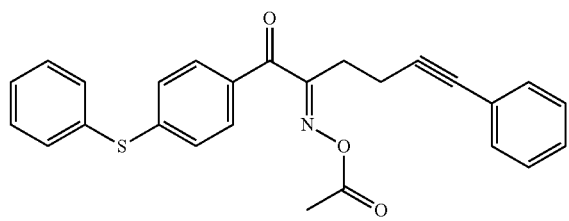
(A-20)
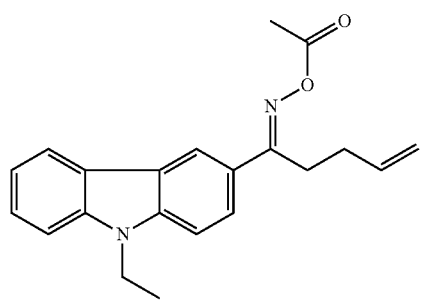
(A-21)
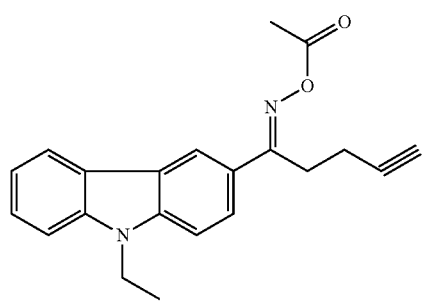
(A-22)
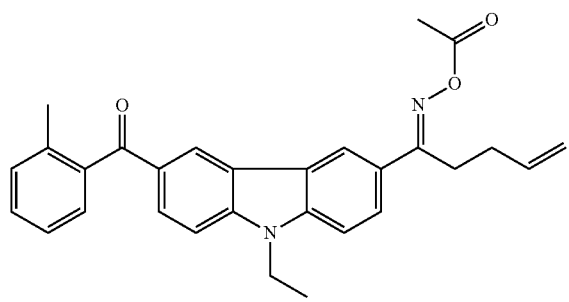
(A-23)
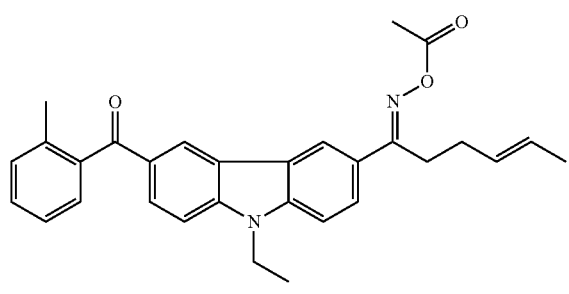
(A-24)
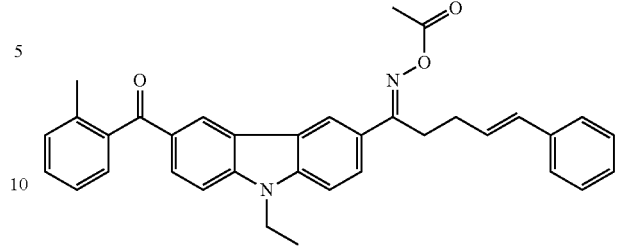
(A-25)
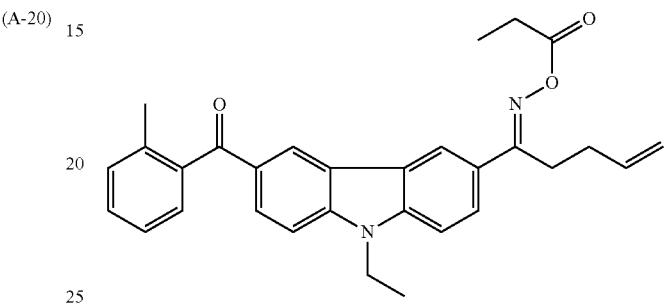
(A-26)
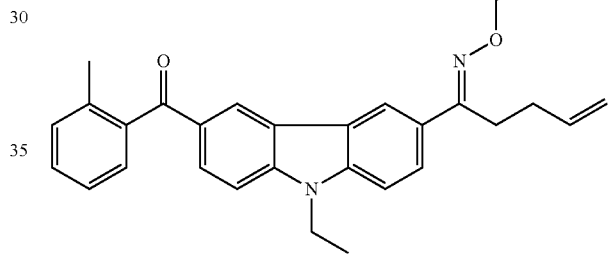
(A-27)
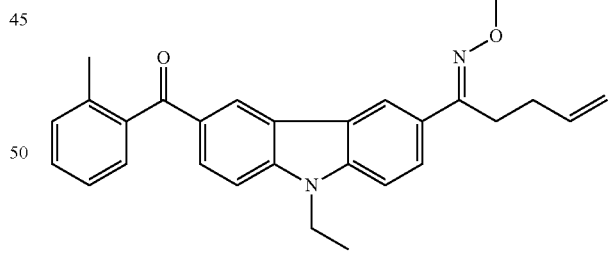
(A-28)
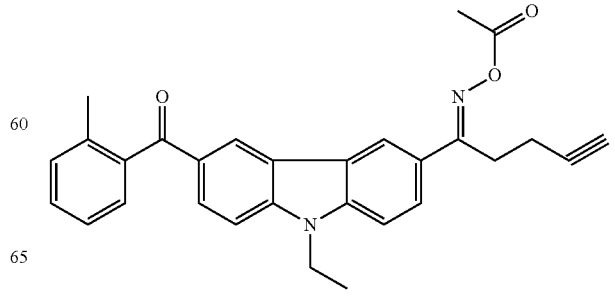

(A-29) 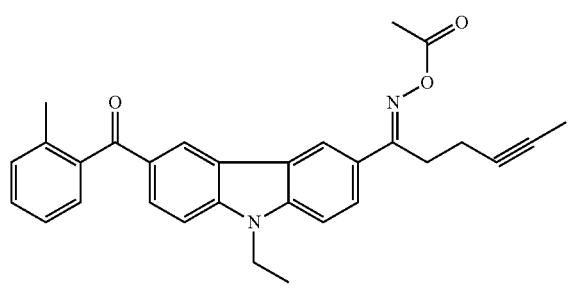

(A-30) 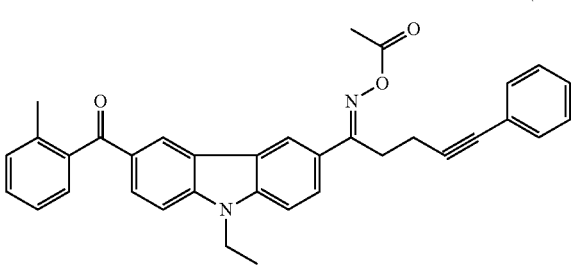

(A-31) 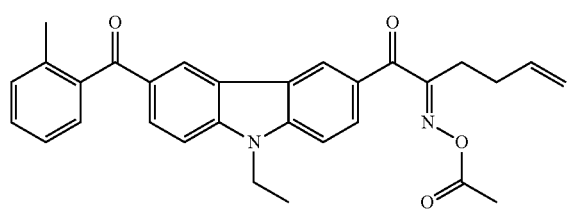

(A-32) 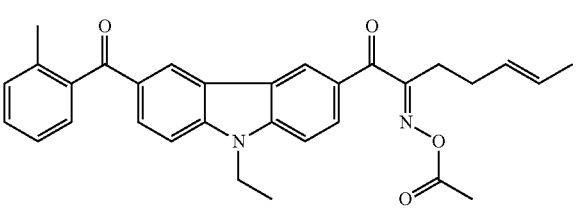

(A-33) 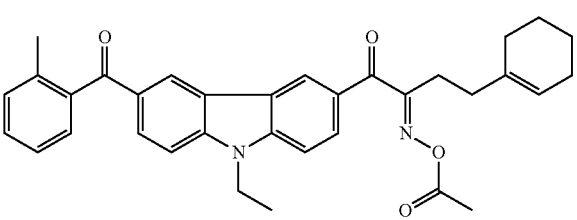

(A-34) 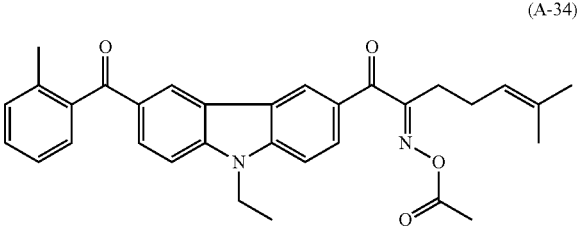

(A-35) 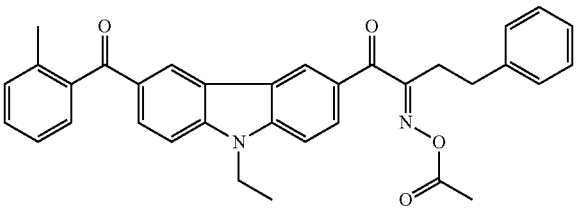

(A-36) 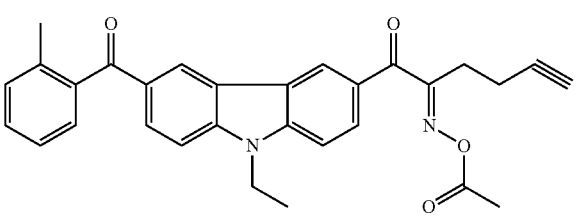

The specific oxime compounds can be added at a rate of 0.1% by mass to 50% by mass, preferably 0.5% by mass to 30% by mass, and especially preferably 1% by mass to 20% by mass with respect to a total solid content of the polymerizable composition of the present invention.

In this range, good sensitivity and stability over time can be obtained. Further, when colored pattern is formed by this polymerizable composition, a pattern with a good shape can be obtained.

According to the present invention, as additives other than the above (A) specific oxime compound, a conventionally known photopolymerization initiator may be used together with the specific oxime compound.

When (A) specific oxime compound is used together with other photopolymerization initiator, the specific oxime compound is used preferably at 50% by mass or more, and more preferably 80% by mass or more with respect to a total amount of photopolymerization initiator.

[(B) Coloring Agent]

A polymerizable composition of the present invention includes (B) coloring agent. By including this coloring agent, the polymerizable composition can have a desired color.

Since the polymerizable composition of the present invention includes (A) specific oxime compound having excellent sensitivity in 365 nm or 406 nm of a light source that is a short wavelength light source, it is possible to cure with high sensitivity even in the case of including a coloring agent with high concentration.

The coloring agent used in the polymerizable composition of the present invention is not particularly limited. As the coloring agent, various dyes or pigments that are conventionally known can be used solely or mixed with 2 or more kinds thereof. The coloring agent can be suitably selected according to an intended use of the polymerizable composition.

When the polymerizable composition of the present invention is used in the production of a color filter, one or both of a chromatic color-based coloring agent such as R, G, B which forms a color pixel of the color filter, and a black-based coloring agent which is generally used for forming a black matrix, may be used.

Among coloring agents that can be used in the polymerizable composition of the present invention, a coloring agent that is suitably used for a color filter is explained as a representative example in detail below.

(Pigment)

As for the pigment, various inorganic pigments or organic pigments that are conventionally known can be used. Moreover, considering that high transmittance is preferable, it is preferable that any of inorganic pigment and organic pigment is as fine as possible. Further, considering a handling property, an average particle diameter of the above pigment is preferably from 0.01 μm to 0.1 μm, and more preferably from 0.01 μm to 0.05 μm.

Examples of the above inorganic pigment include a metal compound represented by metal oxide and metal complex salt. Specific examples of the above inorganic pigment include a metal oxide of iron, cobalt, aluminum, cadmium, lead, copper, titanium, magnesium, chromium, zinc, antimony, and a composite oxide of the above metal.

As for the organic pigment include, for example,

C.I. pigment yellow 11, 24, 31, 53, 83, 93, 99, 108, 109, 110, 138, 139, 147, 150, 151, 154, 155, 167, 180, 185, 199;

C.I. pigment orange 36, 38, 43, 71;

C.I. pigment red 81, 105, 122, 149, 150, 155, 171, 175, 176, 177, 209, 220, 224, 242, 254, 255, 264, 270;

C.I. pigment violet 19, 23, 32, 39;

C.I. pigment blue 1, 2, 15, 15:1, 15:3, 15:6, 16, 22, 60, 66;

C.I. pigment green 7, 36, 37;

C.I. pigment brown 25, 28;

C.I. pigment black 1, 7;

carbon black.

Among them, a pigment which can be used preferably according to the present invention may be included as follows. However, the present invention is not limited to them.

That is, examples of the pigment include:

C.I. pigment yellow 11, 24, 108, 109, 110, 138, 139, 150, 151, 154, 167, 180, 185;

C.I. pigment orange 36, 71;

C.I. pigment red 122, 150, 171, 175, 177, 209, 224, 242, 254, 255, 264;

C.I. pigment violet 19, 23, 32;

C.I. pigment blue 15:1, 15:3, 15:6, 16, 22, 60, 66;

C.I. pigment black 1.

In the present invention, in particular among the structure of pigment itself, the pigments having a basic nitrogen atom may be preferably used. These pigments having basic nitrogen atom exhibit good dispensability in the polymerizable composition of the present invention. Although the reason is not clear, it is estimated that good dispensability may be influenced by good affinity of a pigment for constituents of polymerizable composition.

Although these organic pigments may be used alone, in order to enhance color purity, various combinations thereof may be used.

Specific examples of such combinations are described below.

For example, as for the red pigment, anthraquinone-based pigment, perylene-based pigment, and diketopyrrolopyrrole-based pigment may be used alone. However, at least one kind of them may be mixed with disazo-based yellow pigment, isoindoline-based yellow pigment, quinophthalone-based yellow pigment, or perylene-based red pigment; or anthraquinone-based red pigment and diketopyrrolopyrrole-based red pigment may be mixed with each other. Example of the anthraquinone-based pigment includes C.I. pigment red 177, examples of the perylene-based pigment include C.I. pigment red 155 and C.I. pigment red 224, example of the diketopyrrolopyrrole-based pigment includes C.I. pigment red 254. From the viewpoint of color reproducibility, mixing with C.I. pigment yellow 83, C.I. pigment yellow 139, or C.I. pigment red 177 is preferable.

Further, a mass ratio of red pigment and other pigment is preferably from 100:5 to 100:80. If the mass ratio is less than 100:5, since a suppression of light transmittance in a range of from 400 nm to 500 nm is difficult, color purity may not be enhanced in some case. Further, if other pigment is over 80% by mass, a color development power may be reduced in some case. In particular, as for the mass ratio, the range of from 100:10 to 100:65 is optimal. Further, in the case of combining red pigments, the mass ratio can be control in conjunction with chromaticity.

Further, as for the green pigment, a halogenated phthalocyanine-based pigment may be used singly. However, the halogenated phthalocyanine-based pigment may be mixed with a disazo-based yellow pigment, a quinophthalone-based yellow pigment, an azomethine-based yellow pigment, or an isoindoline-based yellow pigment. For example, as for these examples, mixing of C.I. pigment green 7, 36, 37 with C.I. pigment yellow 83, C.I. pigment yellow 138, C.I. pigment yellow 139, C.I. pigment yellow 150, C.I. pigment yellow 180, or C.I. pigment yellow 185 are preferable.

A mass ratio of green pigment and yellow pigment is preferably from 100:5 to 100:200. When the mass ratio is less than 100:5, since a suppression of light transmittance in a range of from 400 nm to 500 nm is difficult, color purity may not be enhanced in some case. Further, if the mass ratio is higher than 100:200, a main wavelength shifts to a longer wavelength side, so that a deviation from NTSC target color may become large in some case. As for the above mass ratio, the range of from 100:20 to 100:150 is particularly preferable.

As for the blue pigment, a phthalocyanine-based pigment may be used alone, however, a phthalocyanine-based pigment may be mixed with dioxadine-based violet pigment. In particular, suitable examples include a mixture of C.I. pigment blue 15:6 and C.I. pigment violet 23.

The mass ratio of blue pigment and violet pigment is preferably from 100:0 to 100:100, and more preferably 100:70 or less.

Further, with respect to a preferable pigment used for a black matrix, carbon black, graphite, titanium black, iron oxide, or titanium dioxide may be used alone or as a mixture thereof. A combination of carbon black and titanium black is preferable.

A mass ratio of carbon black and titanium black is preferably in the range of from 100:0 to 100:60. When the mass ratio is 100:61 or more, dispersion stability may be deteriorated in some cases.

When the polymerizable composition of the present invention is used in the production of color filter, from the view point of color unevenness or contrast, primary particle diameter of a pigment is preferably from 1 nm to 100 nm, more preferably from 10 nm to 70 nm, further more preferably from 10 nm to 50 nm, and most preferably from 10 nm to 40 nm.

(Dye)

As for a dye, the dye can be suitably selected from known dyes according to its objects, and the dye may be incorporated solely or in a combination of two or more kinds thereof.

Among them, an organic solvent-soluble dye is preferable. An organic solvent-soluble dye which may be used in the present invention is not particularly limited, and dyes known from the past to use for a color filter may be used.

Here, an organic solvent-solubility of a dye refers to a property that the dye is completely dissolved in an organic solvent (25° C.) so as to make a 20% solution.

Examples of the organic solvent-soluble dye include a coloring material described in JP-A No. 64-90403, JP-A No. 64-91102, JP-A-1-94301, JP-A No. 6-11614, Japanese Patent No. 2592207, U.S. Pat. No. 4,808,501, U.S. Pat. No. 5,667, 920, U.S. Pat. No. 5,059,500, JP-A No. 6-35183, or the like.

Further, examples of the chemical structure include azo-based dyes such as pyrazolazo-based, anilinoazo-based, pyrazolotriazoleazo-based, or pyridonazo-based, and other dye such as triphenyl methane-based, anthraquinone-based, benzylidene-based, oxonol-based, cyanine-based, phenothiazine-based, pyrrolopyrazoleazomethine-based, xanthene-based, phthalocyanine-based, benzopyrane-based, or indigo-based dyes.

In particular, pyrazolazo-based, anilinoazo-based, pyrazolotriazoleazo-based, pyridoneazo-based, or anthrapyridone-based dyes are preferred.

In addition, a dye such as a direct dye, an basic dye, a mordant dye, an acid mordant dye, an azoic dye, a dispersion dye, an oil-soluble dye, a food dye, and/or, a derivative thereof are also useful.

Hereinafter, an acid dye and derivative thereof are explained.

An acid dye is not particularly limited, if the acid dye is a coloring material having an acid group such as a sulfonic acid, a carboxylic acid, or a phenolic hydroxyl group. However, the acid dye is selected considering all properties to be required such as a preparation of composition, an organic solvent used in a development, or a solubility with respect to a developer, a salt forming property with a basic compound, an absorbance, an interaction with other component in a curable composition, a light resistant, a heat resistant.

Hereinafter, specific examples of the acid dye are described, however, the present invention is not limited to them. Examples of the acid dye follow.

acid alizarin violet N;
acid black 1, 2, 24, 48;
acid blue 1, 7, 9, 15, 18, 23, 25, 27, 29, 40, 42, 45, 51, 62, 70, 74, 80, 83, 86, 87, 90, 92, 96, 103, 112, 113, 120, 129, 138, 147, 150, 158, 171, 182, 192, 210, 242, 243, 256, 259, 267, 278, 280, 285, 290, 296, 315, 324:1, 335, 340;
acid chrome violet K;
acid Fuchsin;
acid green 1, 3, 5, 9, 16, 25, 27, 50, 58, 63, 65, 80, 104, 105, 106, 109;
acid orange 6, 7, 8, 10, 12, 26, 50, 51, 52, 56, 62, 63, 64, 74, 75, 94, 95, 107, 108, 169, 173;
acid red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 182, 183, 198, 206, 211, 215, 216, 217, 227, 228, 249, 252, 257, 258, 260, 261, 266, 268, 270, 274, 277, 280, 281, 195, 308, 312, 315, 316, 339, 341, 345, 346, 349, 382, 383, 394, 401, 412, 417, 418, 422, 426;
acid violet 6B, 7, 9, 17, 19;
acid yellow 1, 3, 7, 9, 11, 17, 23, 25, 29, 34, 36, 38, 40, 42, 54, 65, 72, 73, 76, 79, 98, 99, 111, 112, 113, 114, 116, 119, 123, 128, 134, 135, 138, 139, 140, 144, 150, 155, 157, 160, 161, 163, 168, 169, 172, 177, 178, 179, 184, 190, 193, 196, 197, 199, 202, 203, 204, 205, 207, 212, 214, 220, 221, 228, 230, 232, 235, 238, 240, 242, 243, 251;
Direct Yellow 2, 33, 34, 35, 38, 39, 43, 47, 50, 54, 58, 68, 69, 70, 71, 86, 93, 94, 95, 98, 102, 108, 109, 129, 136, 138, 141;
Direct Orange 34, 39, 41, 46, 50, 52, 56, 57, 61, 64, 65, 68, 70, 96, 97, 106, 107;
Direct Red 79, 82, 83, 84, 91, 92, 96, 97, 98, 99, 105, 106, 107, 172, 173, 176, 177, 179, 181, 182, 184, 204, 207, 211, 213, 218, 220, 221, 222, 232, 233, 234, 241, 243, 246, 250;
Direct Violet 47, 52, 54, 59, 60, 65, 66, 79, 80, 81, 82, 84, 89, 90, 93, 95, 96, 103, 104;
Direct Blue 57, 77, 80, 81, 84, 85, 86, 90, 93, 94, 95, 97, 98, 99, 100, 101, 106, 107, 108, 109, 113, 114, 115, 117, 119, 137, 149, 150, 153, 155, 156, 158, 159, 160, 161, 162, 163, 164, 166, 167, 170, 171, 172, 173, 188, 189, 190, 192, 193, 194, 196, 198, 199, 200, 207, 209, 210, 212, 213, 214, 222, 228, 229, 237, 238, 242, 243, 244, 245, 247, 248, 250, 251, 252, 256, 257, 259, 260, 268, 274, 275, 293;
Direct Green 25, 27, 31, 32, 34, 37, 63, 65, 66, 67, 68, 69, 72, 77, 79, 82;
Mordant Yellow 5, 8, 10, 16, 20, 26, 30, 31, 33, 42, 43, 45, 56, 50, 61, 62, 65;
Mordant Orange 3, 4, 5, 8, 12, 13, 14, 20, 21, 23, 24, 28, 29, 32, 34, 35, 36, 37, 42, 43, 47, 48;
Mordant Red 1, 2, 3, 4, 9, 11, 12, 14, 17, 18, 19, 22, 23, 24, 25, 26, 30, 32, 33, 36, 37, 38, 39, 41, 43, 45, 46, 48, 53, 56, 63, 71, 74, 85, 86, 88, 90, 94, 95;
Mordant Violet 2, 4, 5, 7, 14, 22, 24, 30, 31, 32, 37, 40, 41, 44, 45, 47, 48, 53, 58;
Mordant Blue 2, 3, 7, 8, 9, 12, 13, 15, 16, 19, 20, 21, 22, 23, 24, 26, 30, 31, 32, 39, 40, 41, 43, 44, 48, 49, 53, 61, 74, 77, 83, 84;
Mordant Green 1, 3, 4, 5, 10, 15, 19, 26, 29, 33, 34, 35, 41, 43, 53;
Food Yellow 3;
and derivatives of these dyes.

Even among the above acid dyes, dyes such as acid black 24;
acid blue 23, 25, 29, 62, 80, 86, 87, 92, 138, 158, 182, 243, 324:1;
acid orange 8, 51, 56, 74, 63;
acid red 1, 4, 8, 34, 37, 42, 52, 57, 80, 97, 114, 143, 145, 151, 183, 217, 249;
acid violet 7;
acid yellow 17, 25, 29, 34, 42, 72, 76, 99, 111, 112, 114, 116, 134, 155, 169, 172, 184, 220, 228, 230, 232, 243;
acid green 25;
and derivatives of these dyes are preferable.

As for the derivative of acid dye, an inorganic salt of acid dye with sulfonic acid or carboxylic acid, or a salt with a nitrogen-containing compound may be used. The derivative of acid dye is not particularly limited if the derivative of acid dye can be dissolved so as to form a curable composition solution, and the derivative of acid dye is selected considering all propertieses to be required such as solubility with respect to an organic solvent or a developer, absorbance, interaction with other component in a polymerizable composition, light resistance, and heat resistance.

The content of (B) coloring agent in the present invention is preferably from 50% by mass to 80% by mass, and more preferably from 60% by mass to 80% by mass, with respect to a total solid content of polymerizable composition.

[(C) Polymerizable Monomer]

A polymerizable composition of the present invention includes (C) polymerizable monomer.

The polymerizable monomer is not particularly limited if the polymerizable monomer is polymerized by an action of photopolymerization initiator. However, the polymerizable monomer is preferably an addition polymerizable compound having at least one ethylenically unsaturated double bond, and it is preferable to have at lease one terminal ethylenically unsaturated bonds. More preferably the polymerizable monomer is selected from a compound having two or more terminal ethylenically unsaturated bonds.

Examples of a monomer include unsaturated carboxylic acid (for example, acrylic acid, methacrylic acid, itaconic acid, crotonic acid, iso crotonic acid, maleic acid), esters thereof and amides thereof. Preferably, esters of unsaturated carboxylic acids with aliphatic multivalent alcohol compounds, or amides of unsaturated carboxylic acids with aliphatic multivalent amine compounds are used. Also, an addition-reaction product of unsaturated carboxylic acid ester or amide having a nucleophilic substituent such as a hydroxyl group, an amino group, or a mercapto group with monofunctional or multifunctional isocyanates or epoxys; and a dehydration condensation reaction product of unsaturated carboxylic acid esters or amides having a nucleophilic substituent such as a hydroxyl group, an amino group, or a mercapto group with a monofunctional or multifunctional carboxylic acid may be suitably used. Also an addition-reaction product of unsaturated carboxylic esters or amides having an electrophilic substituent such as isocyanate group or an epoxy group with monofunctional or multifunctional alcohols, amines, or thiols; or a substitution reaction product of unsaturated carboxylic ester or amides having an elimination substituent such as a halogen group or a tosyloxy group with monofunctional or multifunctional alcohols, amines, or thiols is also suitable. Further, as for other examples, it is also possible to use compounds in which the above unsaturated carboxylic acid is substituted by an unsaturated phosphonic acid, styrene, vinyl ether, or the like.

Specific examples of an ester monomer of an aliphatic multivalent alcohol compound with unsaturated carboxylic acid follow.

Examples of acrylic acid esters include ethyleneglycol diacrylate, triethyleneglycol diacrylate, 1,3-butanediol diacrylate, tetramethyleneglycoldiacrylate, propyleneglycol diacrylate, neopentylglycol diacrylate, trimethylolpropane triacrylate, trimethylolpropane tri(acryloyl oxy propyl)ether, trimethylol ethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitolpentaacrylate, sorbitol hexaacrylate, tri(acryloyloxyethyl)isocyanurate, polyester acrylate oligomer, and isocyanuric EO modified triacrylate.

Examples of methacrylic acid esters include tetramethyleneglycol dimethacrylate, triethyleneglycol dimethacrylate, neopentylglycol dimethacrylate, trimethylolpropane trimethacrylate, trimethylol ethane trimethacrylate, ethyleneglycol dimethacrylate, 1,3-butanediol dimethacrylate, hexanediol dimethacrylate, pentaerythritoldimethacrylate, pentaerythritol trimethacrylate, pentaerythritol tetramethacrylate, dipentaerythritol dimethacrylate, dipentaerythritolhexamethacrylate, sorbitol trimethacrylate, sorbitol tetramethacrylate, bis[p-(3-methacryloxy-2-hydroxypropoxy)phenyl]dimethylmethane, and bis-[p-methacryloxyethoxy)phenyl]dimethylmethane.

Examples of itaconic acid esters include ethyleneglycol diitaconate, propyleneglycol diitaconate, 1,3-butanediol diitaconate, 1,4-butanediol diitaconate, tetramethyleneglycol diitaconate, pentaerythritol diitaconate, and sorbitol tetraitaconate. Examples of crotonic acid esters include ethyleneglycol dicrotonate, tetramethyleneglycol dicrotonate, pentaerythritol dicrotonate, and sorbitol tetradicrotonate. Examples of isocrotonic acid esters include ethyleneglycol diisocrotonate, pentaerythritol diisocrotonate, and sorbitol tetraisocrotonate. Examples of maleic acid esters include ethyleneglycoldimaleate, triethyleneglycoldimaleate, pentaerythritoldimaleate, and sorbitoltetramaleate.

As for examples of other esters, for example, aliphatic alcohol-based esters described in JP-B No. 51-47334 and JP-A No. 57-196231; esters having an aromatic skeleton described in JP-A No. 59-5240, JP-A No. 59-5241 and JP-A No. 2-226149; and esters having an amino group described in JP-A No. 1-165613 may be used suitably. Further the above described ester monomers may be used as a mixture.

Further, specific examples of amide monomer of aliphatic multivalent amine compound with unsaturated carboxylic acid include methylenebis-acrylamide, methylenebis-methacrylamide, 1,6-hexamethylenebis-acrylamide, 1,6-hexamethylenebis-methacrylamide, diethylenetriaminetrisacrylamide, xylenebisacrylamide, and xylenebismethacrylamide. Other examples of preferable amide-based monomers include amides having a cyclohexylene structure described in JP-B No. 54-21726.

Also, a urethane-based addition polymerizable compound produced by using addition reaction of isocyanate with a hydroxyl group, is suitable. Specific example of the urethane-based addition polymerizable compound include a vinyl urethane compound having at least two polymerizable vinyl group in the molecule thereof wherein vinyl monomer having a hydroxyl group represented by the following general formula (I) is added to a polyisocyanate compound having at least two isocyanate group in the molecule thereof described in JP-B No. 48-41708.

$$CH_2=C(R)COOCH_2CH(R')OH \qquad (I)$$

(Wherein, R and R' each represent H or $CH_3$.)

Also, a urethane acrylates described in JP-A No. 51-37193, JP-B No. 2-32293, JP-B No. 2-16765, a urethane compound having an ethyleneoxide-based skeleton described in JP-B No. 58-49860, JP-B No. 56-17654, JP-B No. 62-39417, JP-B No. 62-39418 are also suitable. Further, by using polymerizable compounds having an amino structure or a sulfide structure in the molecule described in JP-A No. 63-277653, JP-A No. 63-260909, JP-A No. 1-105238, a polymerizable composition which shows very excellent photosensitive speed can be obtained.

In addition, examples of other polymerizable monomers include a multifunctional acrylate or a methacrylate such as polyester acrylates and epoxy acrylates which are produced by reacting an epoxy resin with (meth)acrylic acid, each described in JP-A No. 48-64183, JP-B No. 49-43191, and JP-B No. 52-30490. Further, examples of other polymerizable monomers include a specific unsaturated compound described in JP-B No. 46-43946, JP-B No. 1-40337, and JP-B No. 1-40336, and a vinyl phosphonic acid-based compound described in JP-A No. 2-25493. Further, in some case, perfluoroalkyl group-including structure described in JP-A-S61-22048 is suitably used. Further, photocurable monomer disclosed in Japan Adhesive Association Magazine vol. 20, No. 7, pp 300 to 308 (1984) may be also used.

Among the above described polymerizable monomer, the polymerizable monomer having an acidic group (may be also referred to as "an acidic functional group") is more preferable from the view point of a developing property improvement and a residue improvement when a polymerizable composition of the present invention is applied to a color filter.

Hereinafter, a polymerizable monomer having an acidic group is explained.

When a polymerizable composition includes a polymerizable monomer having an acidic group, a crosslink density is increased by a heat polymerizable functional group or a photopolymerizable functional group of the monomer, further, alkaline solubility is increased by an acidic functional group of the monomer. Therefore, for the polymerizable composition of the present invention, although a component, which has neither cure reactivity nor alkaline solubility, such as coloring agent or polymerization initiator is increased, a crosslink density and an alkaline solubility are increased by addition of a polymerizable monomer having acidic functional group, whereby an excellent polymerizability and an alkaline developing property can be obtained.

As for a polymerizable monomer having an acidic functional group, the monomer which can be dissolved or dispersed in an alkaline developer is preferable.

Examples of the acidic functional group of polymerizable monomer include a carboxylic group, a sulfonic group, and a phosphoric group. From a viewpoint of solubility with respect to an alkaline developer and a handling property of the composition, a carboxylic group is preferable.

As for the polymerizable monomer having an acidic functional group, (1) a monomer in which a carboxylic group has been introduced by modifying a monomer or oligomer having at least three heat polymerizable functional groups or photopolymerizable functional groups together with a hydroxyl group with a dibasic acid anhydride, (2) a monomer in which a sulfuric acid has been introduced by modifying an aromatic compound having at last three heat polymerizable functional groups or photopolymerizable functional groups with a concentrated sulfuric acid or a fuming sulfuric acid, or the like may be used. Further, oligomers which include the polymerizable monomer itself as a repeating unit may be also used as a polymerizable monomer.

As for the polymerizable monomer having acidic group of the present invention, at least one compound selected from the compounds represented by the following general formula (11) or (12) is preferable.

As for the general formula (11) and general formula (12), in the case in which $T^1$ or $G^1$ represents an alkyleneoxy chain, a terminal at the carbon atom side of the alkyleneoxy chain is bonded to $R^1$, $X^1$ and $W^1$.

General Formula (11)

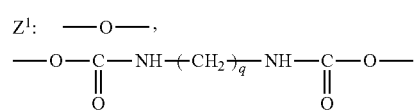

In the above general formula (11), $R^1$, $T^1$, and $X^1$ represents any one of the following groups. n represents an integer of from 0 to 14.

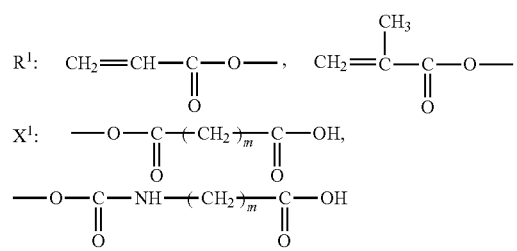

m represents an integer of from 1 to 8.

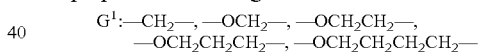

General Formula (12)

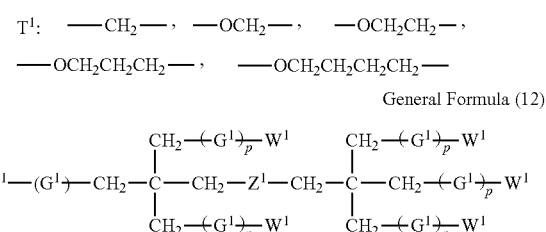

In the above general formula (12), $Z^1$ and $G^1$ represent any one of the following groups. $W^1$ has the same definition as the $R^1$ or $X^1$ of the above general formula (11), 3 or more of 6 $W^1$ have the same definitions as the $R^1$. p represents an integer of from 0 to 14.

$Z^1$: —O—,

—O—C(=O)—NH—(CH$_2$)$_q$—NH—C(=O)—O— q represents an integer of from 1 to 8.

$G^1$: —CH$_2$—, —OCH$_2$—, —OCH$_2$CH$_2$—,
—OCH$_2$CH$_2$CH$_2$—, —OCH$_2$CH$_2$CH$_2$CH$_2$—

Among the compounds represented by the general formula (11) or the general formula (12), pentaerythritol derivative and/or dipentaerythritol derivative are more preferable.

Specifically, the exemplified compounds of (C-1) to (C-12) shown below are preferable. Among them, exemplified compounds of (C-1), (C-2), (C-3), (C-5) and (C-7) are most preferable.

(C-1)

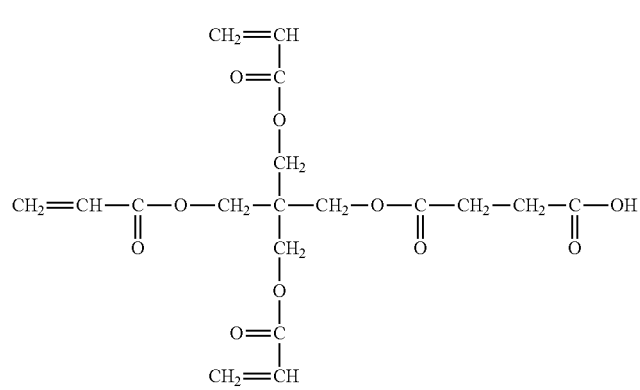

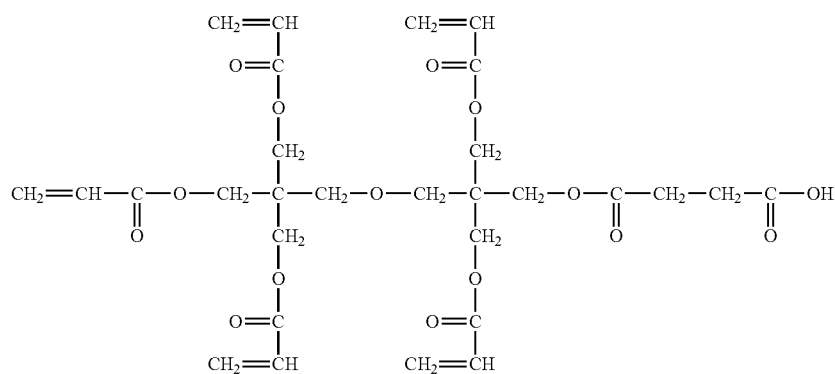
(C-2)
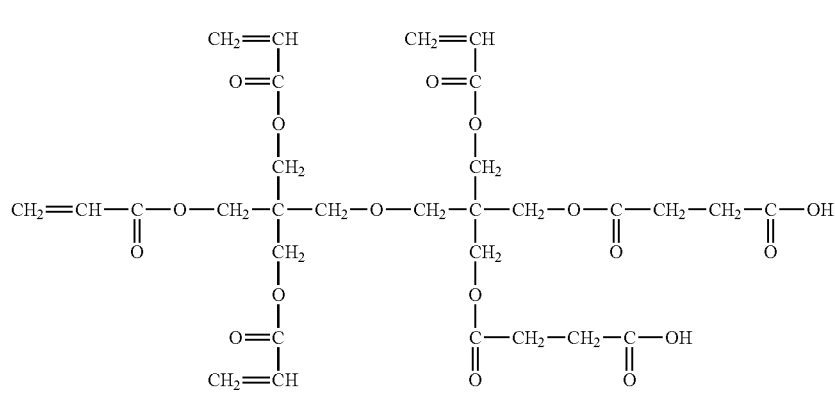
(C-3)
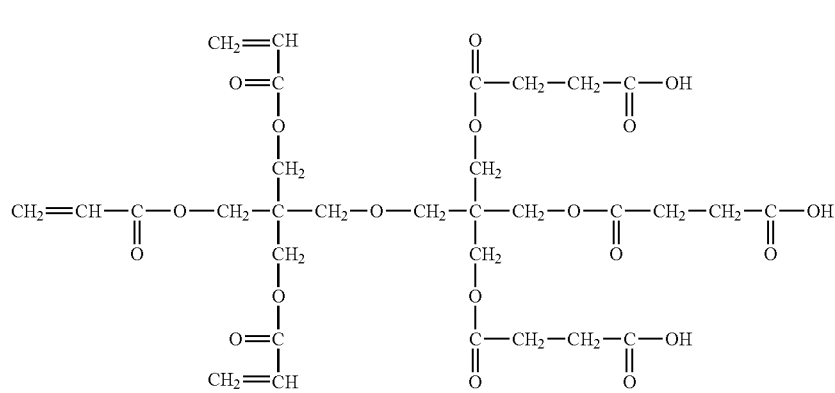
(C-4)
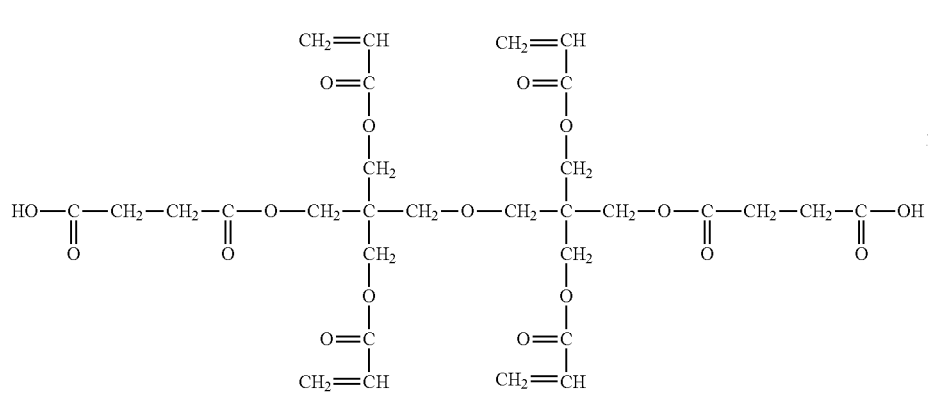
(C-5)

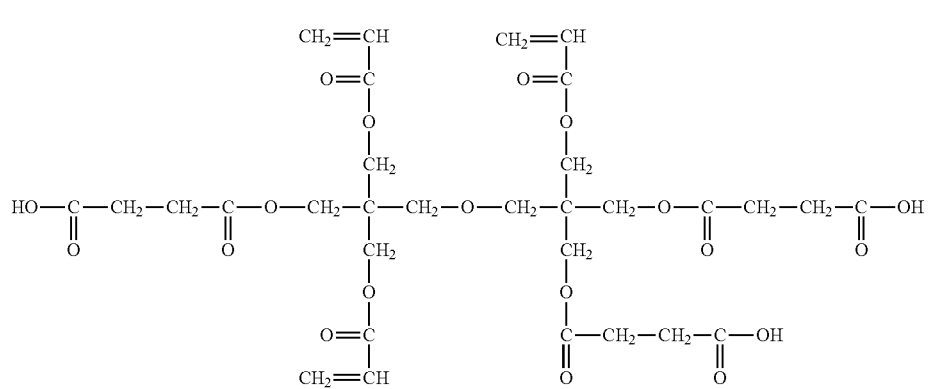
(C-6)
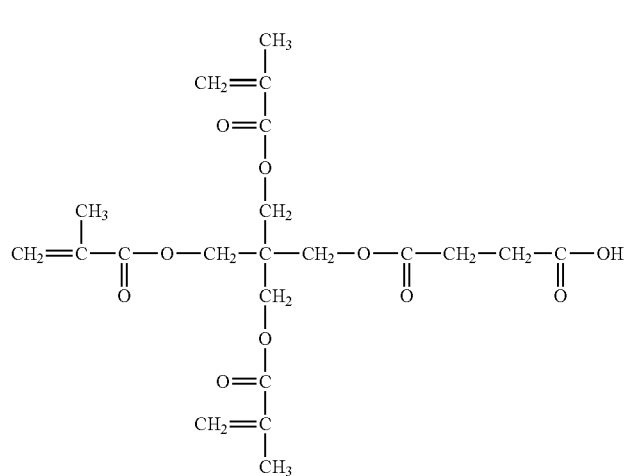
(C-7)
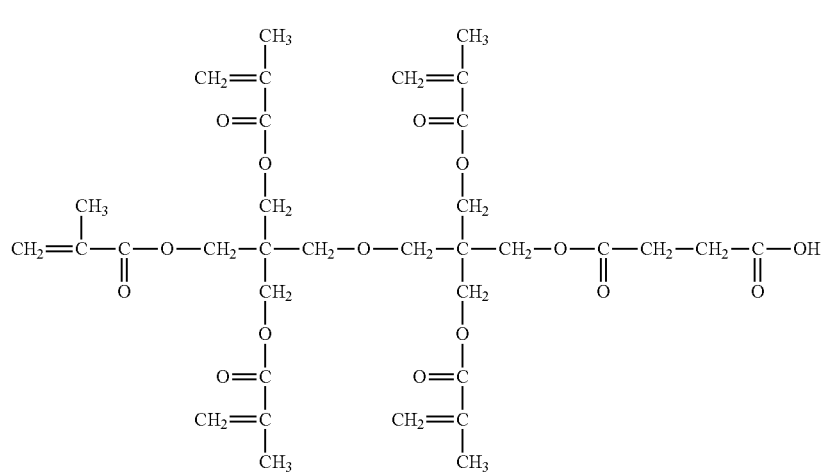
(C-8)

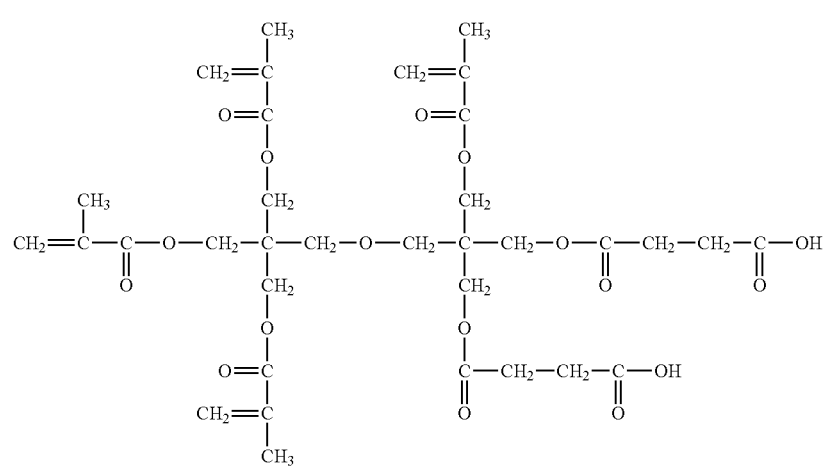
(C-9)
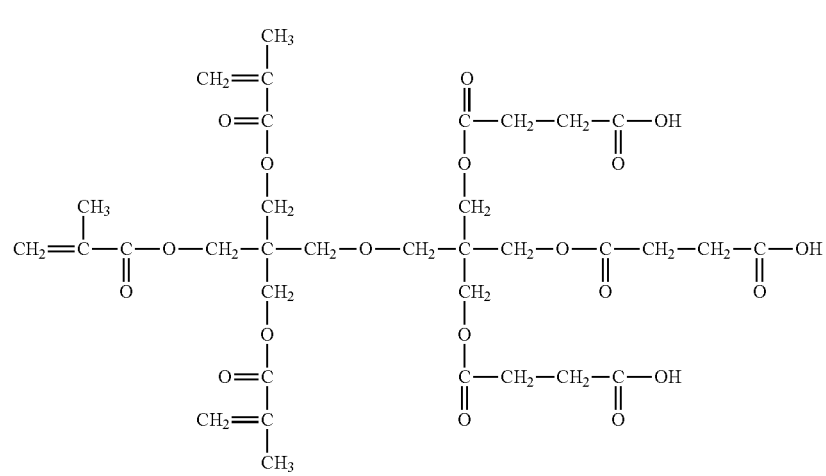
(C-10)
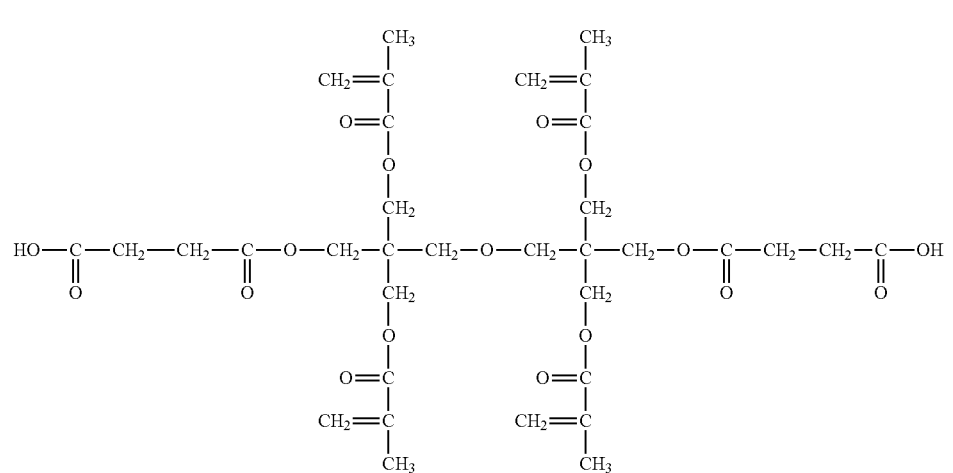
(C-11)

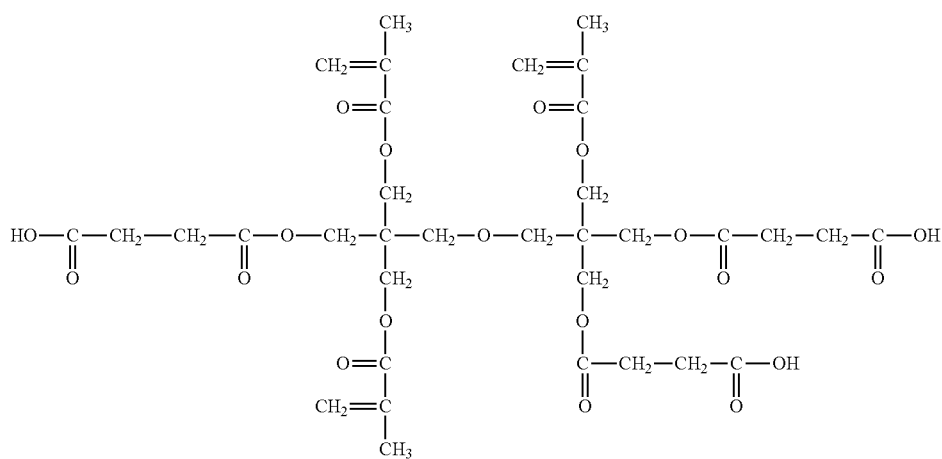

(C-12)

With regard to the polymerizable monomer, details of usage thereof such as a structure thereof, a single use or combination use thereof, an addition amount thereof or the like can be arbitrarily set in accordance with a performance design of the final polymerizable composition. For example, the usage is selected from the following viewpoints.

For the viewpoint of sensitivity, a structure including a high content of unsaturated group per 1 molecule is preferable. In many cases, at least two functions are preferable. Further, in order to increase strength of cured film, three or more functions are preferable. Further, a method is useful in which polymerizable monomers having different functional numbers or different polymerizable groups (for example, acrylic acid esters, methacrylic acid esters, styrene-based compounds, vinyl ether-based compounds) are used in combination whereby both sensitivity and strength are controlled.

Further, for compatibility and dispensability with other components (for example, a binder, a polymerization initiator, a coloring agent (a pigment, a dye, or the like) in the polymerizable composition, selection and usage of the polymerizable monomer are important factors. For example, by using together a low purity compound, or by using two or more kinds of compounds in combination, an improvement of compatibility may be occurred.

Further, in the case in which a polymerizable composition of the present invention is applied to a preparation of the color filter, for the purpose of improving adhesion of a support, other layers or the like, in some case, particular structure may be selected.

The polymerizable monomer is used in the range of preferably from 5% by mass to 70% by mass, and more preferably from 10% by mass to 60% by mass, with regard to a total solid content of the polymerizable composition.

Further, they may be used alone or used in a combination of two or more kinds.

In addition, as for a usage of the polymerizable monomer, a suitable structure, composition, and addition amount may be arbitrarily selected from the viewpoint such as major or minor polymerization inhibition against oxygen; resolution; fogging property; change of refractive index; surface stickiness; or the like.

[(D) Binder Polymer]

A polymerizable composition of the present invention includes (D) binder polymer from the viewpoint such as improvement of coated film characteristic, or the like.

As for the (D) binder polymer, it is preferable to use a linear organic polymer. As for the "linear organic polymer", known polymer may be used arbitrarily. Also, in order to make the polymerizable composition of the present invention water-developable or alkalescent-water-developable, a linear organic polymer which is soluble or swellable in water or alkalescent water is selected.

That is, in the polymerizable composition of the present invention, a linear organic polymer is not only used to improve film forming properties, but also suitably selected to use according to the purposes such as improvement of developing property with respect to a developer such as water, or alkalescent water or an organic solvent. For example, if a water soluble linear organic polymer is used, water development can be performed.

Examples of the linear organic polymer which is soluble or swellable in water or alkalescent water include a radical polymer which has carboxylic acid group in the side chain, which is described in, for example, JP-A No. 59-44615, JP-B No. 54-34327, JP-B No. 58-12577, JP-B No. 54-25957, JP-A No. 54-92723, JP-A No. 59-53836, JP-A No. 59-71048, namely, a resin in which a monomer having carboxylic group is homopolymerized or copolymerized; a resin in which an acid anhydride unit in which a monomer having acid anhydride is homopolymerized or copolymerized, is hydrolyzed, half esterified, or half amidated; and an epoxy acrylate in which epoxy resin is modified by unsaturated carboxylic acid and acid anhydride.

Examples of the monomer having a carboxylic group include acrylic acid, methacrylic acid, itaconic acid, crotonic acid, maleic acid, fumaric acid, and 4-carboxylstyrene. Further, examples of the monomer having acid anhydride include maleic anhydride.

Further, as for the water soluble linear organic polymer, an acidic cellulose derivative having a carboxylic acid group at the side chain thereof may be used. In addition, for example, a cyclic acid anhydride adduct of a polymer having hydroxyl group is also useful.

As described above, when a linear organic polymer which is soluble or swellable in water or alkalescent water is a copolymer, examples of the monomer which is copolymerized with the monomer having the above carboxylic group or the monomer having acid anhydride, include compounds described in the following (1) to (12).

(1) Acrylic acid esters and methacrylic acid esters having an aliphatic hydroxyl group such as 2-hydroxyethylacrylate, 2-hydroxypropylacrylate, 3-hydroxypropylacrylate, 4-hydroxybutylacrylate, 2-hydroxyethylmethacrylate, 2-hydroxypropylmethacrylate, 3-hydroxypropylmethacrylate, and 4-hydroxybutylmethacrylate.

(2) Alkyl acrylate such as methyl acrylate, ethyl acrylate, propyl acrylate, butyl acrylate, isobutyl acrylate, amyl acrylate, hexyl acrylate, 2-ethyl hexylacrylate, octyl acrylate, benzyl acrylate, 2-chloro ethyl acrylate, glycidyl acrylate, 3,4-epoxy cyclohexyl methyl acrylate, vinyl acrylate, 2-phenyl vinyl acrylate, 1-propenyl acrylate, allyl acrylate, 2-allyloxy ethyl acrylate, and propargyl acrylate.

(3) Alkyl methacrylate such as methyl methacrylate, ethyl methacrylate, propyl methacrylate, butyl methacrylate, isobutyl methacrylate, amyl methaacrylate, hexyl methaacrylate, 2-ethylhexyl methaacrylate, cyclohexyl methacrylate, benzyl methacrylate, 2-chloroethyl methacrylate, glycidyl methacrylate, 3,4-epoxycyclohexyl methyl methacrylate, vinyl methacrylate, 2-phenyl vinyl methacrylate, 1-propenyl methacrylate, allyl methacrylate, 2-allyloxyethyl methacrylate, and propargyl methacrylate.

(4) Acryl amide or methacryl amide such as acryl amide, methacrylamide, N-methylol acrylamide, N-ethyl acrylamide, N-hexyl methacrylamide, N-cyclohexyl acrylamide, N-hydroxyethyl acrylamide, N-phenyl acrylamide, N-nitrophenyl acrylamide, N-ethyl-N-phenyl acrylamide, vinyl acrylamide, vinyl methacrylamide, N,N-diallyl acrylamide, N,N-diallyl methacrylamide, allyl acrylamide, and allyl methacrylamide.

(5) Vinylethers such as ethyl vinylether, 2-chloroethyl vinylether, hydroxyethyl vinylether, propyl vinylether, butyl vinylether, octyl vinylether, and phenyl vinylether.

(6) Vinyl esters such as vinyl acetate, vinyl chloroacetate, vinyl butylate, and vinyl benzoate.

(7) Styrenes such as styrene, α-methyl styrene, methyl styrene, chloromethyl styrene, and p-acetoxy styrene.

(8) Vinyl ketones such as methyl vinyl ketone, ethyl vinyl ketone, propyl vinyl ketone, phenyl vinyl ketone and so forth.

(9) Olefins such as ethylene, propylene, isobutylene, butadiene, and isoprene.

(10) N-vinyl pyrrolidone, acrylonitrile, methacrylonitrile, and so forth.

(11) Unsaturated imide such as maleimide, N-acryloyl acrylamide, N-acetyl methacrylamide, N-propionyl methacrylamide, and N-(p-chloro benzoyl)methacryl amides.

(12) Methacrylic acid-based monomer on which hetero atom is bound to a position. Examples of the methacrylic acid-based monomer include compounds described in JP-A No. 2002-309057 and JP-A No. 2002-31156.

Particularly preferred are (meth)acrylic resins having an allyl or vinyl ester group and a carboxyl group in a side chain, the alkali-soluble resins having a double bond in a side chain described in JP-A Nos. 2000-187322 and 2002-62698, and the alkali-soluble resins having an amide group in a side chain described in JP-A No. 2001-242612, in view of excellent balance among film strength, sensitivity and developability.

The acid group-containing urethane binder polymers described in JP-B Nos. 07-12004, 07-120041, 07-120042, and 08-12424, JP-A Nos. 63-287944, 63-287947 and 01-271741, and Japanese Patent Application No. 10-116232 and the urethane binder polymers having acid groups and double bonds in a side chain described in JP-A No. 2002-107918 are advantageous in terms of printing durability or low exposure properties, because they have very high strength.

The acid group-containing, acetal-modified, polyvinyl alcohol binder polymers such as those described in European Patent Nos. 993966 and 1204000 and JP-A No. 2001-318463 are also preferred, because they have an excellent balance between film strength and developability.

Useful water-soluble linear organic polymers also include polyvinyl pyrrolidone and polyethyleneoxide. Alcohol-soluble nylon or polyether of 2,2-bis-(4-hydroxyphenyl)-propane and epichlorohydrin is also useful for increasing the strength of the cured film.

A weight average molecular weight of the binder polymers as described above is preferably 5,000 or more, and more preferably in the range of from 10,000 to 300,000, and a number average molecular weight of the binder polymers is preferably 1,000 or more, and more preferably in the range of from 2,000 to 250,000. The polydispersity (weight average molecular weight/number average molecular weight) is preferably 1 or more, and more preferably in the range of from 1.1 to 10.

These binder polymers may be any of random polymers, block polymers, or graft polymers.

The binder polymers as described above may be synthesized by known conventional methods. Examples of solvents that may be used for the synthesis include tetrahydrofuran, ethylene dichloride, cyclohexanone, methyl ethyl ketone, acetone, methanol, ethanol, ethyleneglycol monomethyl ether, ethyleneglycol monoethyl ether, 2-methoxyethyl acetate, diethyleneglycol dimethyl ether, 1-methoxy-2-propanol, 1-methoxy-2-propyl acetate, N,N-dimethyl formamide, N,N-dimethyl acetamide, toluene, ethyl acetate, methyl lactate, ethyl lactate, dimethyl sulfoxide, and water. Only one solvent may be used, or a mixture of two or more solvents may be used.

Further examples of the radical polymerization initiator which is used in synthesizing a binder polymer include an organic peroxide such as benzoyl peroxide, cumene hydroperoxide, t-butyl hydroperoxide, diisopropyl peroxy carbonate, di-t-butyl peroxide, and t-butylperoxy benzoate; and an azo compound such as 2,2'-azobis isobutyronitrile and so forth may be referred.

These radical polymerization initiators are preferably used in the range of from 1 part by mass to 20 parts by mass with respect to 100 parts by mass of the monomer.

From the view point of improving sensitivity, one preferable aspect of the (D) binder polymer is to use a binder polymer having an unsaturated double bond. From the view point of improving optical sensitivity, an unsaturated equivalent amount of the binder polymer having unsaturated double bond is preferably less than 3,000, and more preferably less than 1,500, and most preferably less than 600.

Here, the unsaturated equivalent amount stands for molecular weight of polymer per one unsaturated bond.

By controlling the unsaturated equivalent amount of binder polymer to less than 3,000, namely, by increasing the number of unsaturated double bond in the polymer, photopolymerization ability and sensitivity are improved. Further, by improvement of the polymerization ability, adhesion to a solid surface such as support is improved. As a result, a pattern having a cross section of taper shape or rectangular shape tends to be readily obtained, which is preferable.

Further, the lower limit of an unsaturated equivalent amount is preferably 150. By controlling the unsaturated equivalent amount to 150 or more, when a pigment is used as the (B) coloring agent, an increase of viscosity is suppressed at the time of dispersion of pigment. Thus, a composition more excellent in dispersing stability on storage tends to be obtained, which is preferable.

Examples of the binder having an unsaturated double bond include, as a representative resin, a resin which is formed by reacting a carboxylic group-including resin with a glycidyl group-including unsaturated compound such as glycidyl (meth)acrylate, allyl glycidylether and so forth, or an unsaturated alcohol such as allyl alcohol, 2-hydroxy acrylate, 2-hydroxy methacrylate and so forth; a resin which is formed by reacting a resin containing a carboxylic group having a hydroxyl group with a free isocyanate-including unsaturated compound or an unsaturated acid anhydride; a resin which is formed by reacting an unsaturated carboxylic acid adduct of epoxy resin with a polybasic acid anhydride; a resin which is formed by reacting an unsaturated dicarboxylic acid anhydride adduct of conjugate dien copolymer and an with a hydroxyl group-including polymerizable monomer; and a resin which is formed by synthesizing a resin having a particular functional group which produces an unsaturated group when elimination reaction is induced by a base treatment, and then subjecting the synthesized resin to the base treatment to produce an unsaturated group.

Among them, a resin which is obtained by reacting a carboxylic group-containing resin with a glycidyl group-containing unsaturated compound such as glycidyl (meth)acrylate, allyl glycidylether and so forth; a resin which is obtained by reacting a resin in which a hydroxyl group-containing (meth)acrylic ester-based compound is polymerized, with a (meth)acrylic ester having free isocyanate group such as ethyl (meth)acrylae-2-isocyanate and so forth; resins having structural units represented by general formulae (21) to (23) described below; a resin which is obtained by synthesizing a resin having a particular functional group which produces an unsaturated group when elimination reaction is induced by a base treatment, and then subjecting the synthesized resin to the base treatment to produce an unsaturated group, and so forth are more preferable.

The binder polymer having an unsaturated double bond is preferably a polymer including at least one selected from the structural units represented by any one of the following general formulae (21) to (23).

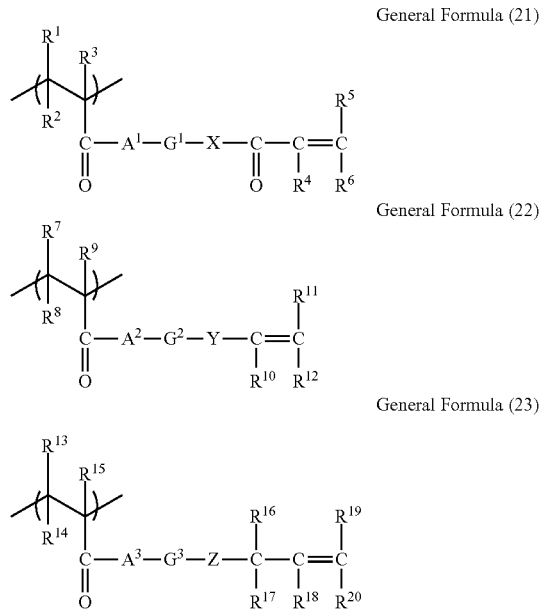

General Formula (21)

General Formula (22)

General Formula (23)

In the above general formulae (21) to (23), $A^1$, $A^2$, and $A^3$ each independently represent, an oxygen atom, a sulfur atom, or —N($R^{21}$)—; and $R^2$ represents an alkyl group which may have a substituent. $G^1$, $G^2$, and $G^3$ each independently represent a divalent organic group. X and Z each independently represent an oxygen atom, a sulfur atom, or —N($R^{22}$)—, and $R^{22}$ represents an alkyl group which may have a substituent. Y represents an oxygen atom, a sulfur atom, a phenylene group which may have a substituent, or —N($R^{23}$)—, and $R^{23}$ represents an alkyl group which may have a substituent. $R^1$ to $R^{20}$ each independently represent a monovalent organic group.

With regard to the above general formula (21), $R^1$ to $R^3$ each independently represent a monovalent organic group and examples thereof include a hydrogen atom, an alkyl group which may have a substituent. Among them, $R^1$ and $R^2$ are preferably a hydrogen atom, and $R^3$ is preferably a hydrogen atom, or a methyl group.

$R^4$ to $R^6$ each independently represent a monovalent organic group. As for $R^4$, examples thereof include a hydrogen atom or an alkyl group which may have a substituent. Among them, a hydrogen atom, a methyl group, and an ethyl group are preferable. As for $R^5$ and $R^6$, examples thereof each independently include a hydrogen atom, a halogen atom, an alkoxycarbonyl group, a sulfo group, a nitro group, a cyano group, an alkyl group which may have a substituent, an aryl group which may have a substituent, an alkoxy group which may have a substituent, an aryloxy group which may have a substituent, an alkylsulfonyl group which may have a substituent, and an arylsulfonyl group which may have a substituent. Among them, a hydrogen atom, an alkoxycarbonyl group, an alkyl group which may have a substituent, and an aryl group which may have a substituent are preferable. Here, as a substituent which may be introduced, methoxycarbonyl group, ethoxycarbonyl group, isopropyloxycarbonyl group, methyl group, ethyl group, phenyl group and so forth may be referred.

$A^1$ represents an oxygen atom, a sulfur atom, or —N($R^{21}$)— and X represents an oxygen atom, a sulfur atom, or —N($R^{22}$)—. Here, as for $R^{21}$ and $R^{22}$, examples thereof include an alkyl group which may have a substituent.

$G^1$ represents a divalent organic group. Preferable examples thereof include an alkylene group which may have a substituent (more preferably, an alkylene group having 1 to 20 carbon atoms, which may have a substituent), a cyclo alkylene group having 3 to 20 carbon atoms, which may have a substituent, and an aromatic group having 6 to 20 carbon atoms, which may have a substituent. Among them, a linear or a branched alkylene group having 1 to 10 carbon atoms which may have a substituent, a cyclo alkylene group having 3 to 10 carbon atoms which may have a substituent, and an aromatic group having from 6 to 12 carbon atoms which may have a substituent are preferable considering properties such as a strength, developing property and so forth.

Here, as for the substituent of $G^1$, among the groups in which a hydrogen atom is bonded to a hetero atom, it is preferable that hydroxyl group is excluded, for example, an amino group, a thiol group, and a carboxylic group are not included.

With respect to the above general formula (22), $R^7$ to $R^9$ each independently represent, a monovalent organic group and examples thereof include a hydrogen atom, and an alkyl group which may have a substituent. Among them, $R^7$ and $R^8$ are preferably a hydrogen atom, and $R^9$ is preferably a hydrogen atom or a methyl group.

$R^{10}$ to $R^{12}$ each independently represent a monovalent group. Specific examples of the monovalent group include a hydrogen atom, a halogen atom, a dialkylamino group, an alkoxycarbonyl group, a sulfo group, a nitro group, a cyano group, an alkyl group which may have a substituent, an aryl group which may have a substituent, an alkoxy group which may have a substituent, an aryl oxy group which may have a substituent, an alkylsulfonyl group which may have a substituent, and an arylsulfonyl group which may have a substituent. Among them, a hydrogen atom, an alkoxycarbonyl group, an alkyl group which may have a substituent, and an aryl group which may have a substituent are preferable.

Here, as for the substituent which may be introduced, the same substituents as those described in general formula (21) are exemplified.

$A^2$ each independently represents an oxygen atom, a sulfur atom, or $—N(R^{21})—$. Here, as for the $R^{21}$, examples thereof include a hydrogen atom, and an alkyl group which may have a substituent.

$G^2$ represents a divalent organic group and an alkylene group which may have a substituent is preferable. Preferable examples include an alkylene group having 1 to 20 carbon atoms which may have a substituent, a cyclo alkylene group having 3 to 20 carbon atoms which may have a substituent, and an aromatic group having 6 to 20 carbon atoms which may have a substituent. Among them, a linear or a branched alkylene group having 1 to 10 carbon atoms which may have a substituent, a cyclo alkylene group having 3 to 10 carbon atoms which may have a substituent, and an aromatic group having 6 to 12 carbon atoms which may have a substituent are preferable considering properties such as a strength, developing property and so forth.

Here, as for the substituent of $G^2$, among the groups in which a hydrogen atom is bonded to a hetero atom, it is preferable that a hydroxyl group is excluded, for example, an amino group, a thiol group, and a carboxylic group are not included.

Y represents an oxygen atom, a sulfur atom, $—N(R^{23})—$ or a phenylene group which may have a substituent. Here, as for the $R^{23}$, examples thereof include a hydrogen atom, and an alkyl group which may have a substituent.

As for the above general formula (23), $R^{13}$ to $R^{15}$ each independently represent a monovalent organic group. Examples thereof include a hydrogen atom, and an alkyl group which may have a substituent. Among them $R^{13}$ and $R^{14}$ are preferably a hydrogen atom, and $R^{15}$ is preferably a hydrogen atom or methyl group.

$R^{16}$ to $R^{20}$ each independently represent a monovalent group. $R^{16}$ to $R^{20}$ represent for example, a hydrogen atom, halogen atom, dialkylamino group, alkoxycarbonyl group, a sulfo group, a nitro group, a cyano group, an alkyl group which may have a substituent, an aryl group which may have a substituent, an alkoxy group which may have a substituent, an aryl oxy group which may have a substituent, an alkylsulfonyl group which may have a substituent, an arylsulfonyl group which may have a substituent and so forth. Among them, a hydrogen atom, an alkoxycarbonyl group, an alkyl group which may have a substituent, and an aryl group which may have a substituent are preferable. As for the substituent which may be introduced, the same substituents as those described in general formula (1) are exemplified.

$A^3$ represents an oxygen atom, a sulfur atom, or $—N(R^{21})—$, and Z represents an oxygen atom, a sulfur atom, or $—N(R^{22})—$. As for the $R^{21}$ and $R^{22}$, examples include the same groups as those described in general formula (21) may be referred.

$G^3$ represents a divalent organic group, and an alkylene group which may have a substituent is preferable. Preferable examples of the divalent organic group include an alkylene group having 1 to 20 carbon atoms which may have a substituent, a cyclo alkylene group having 3 to 20 carbon atoms which may have a substituent, and an aromatic group having 6 to 20 carbon atoms which may have a substituent. Among them, a linear or a branched alkylene group having 1 to 10 carbon atoms which may have a substituent, a cyclo alkylene group having 3 to 10 carbon atoms which may have a substituent, and an aromatic group having 6 to 12 carbon atoms which may have a substituent are preferable considering properties such as a strength, developing property and so forth.

Here, as for the substituent of $G^3$, among the groups in which a hydrogen atom is bonded to a hetero atom, it is preferable that hydroxyl group is excluded, for example, amino group, thiol group, and carboxylic group are not included.

For the structural units represented by the above general formulae (21) to (23), from the view point of curable improvement and reduction in development residue, per one molecule of the binder polymer, a compound in which the structural unit is included in the range of from 20% by mole to less than 95% by mole is preferable. The range of from 25% by mole to 90% by mole is more preferable. The range of from 30% by mole to less than 85% by mole is most preferable.

The synthesis of a polymer having the structural units represented by the above general formulae (21) to (23) can be carried out based on the synthetic methods described in paragraphs [0027] to [0057] of JP-A No. 2003-262958. Among them, Synthetic method 1) in the above publication is preferably used.

The examples of the specific compounds of the polymer having the structural units represented by the above general formulae (21) to (23) include the following polymers 1 to 17.

| Polymer | Composition (% by mole) | Mw |
|---|---|---|
| 1 | 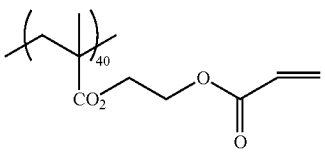 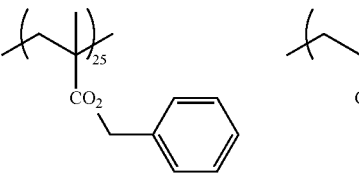 | 97000 |
| 2 | 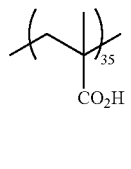 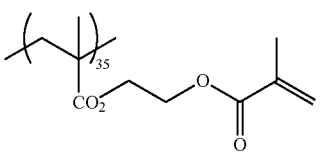 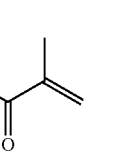 | 29000 |

-continued
| Polymer | Composition (% by mole) | Mw |
|---|---|---|
| 3 | 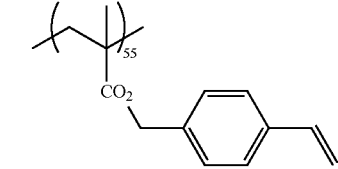 | 54000 |
| 4 | 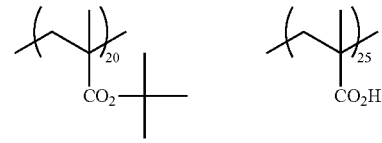 | 16000 |
| 5 | 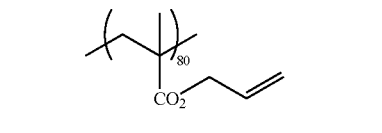 | 8700 |
| 6 | 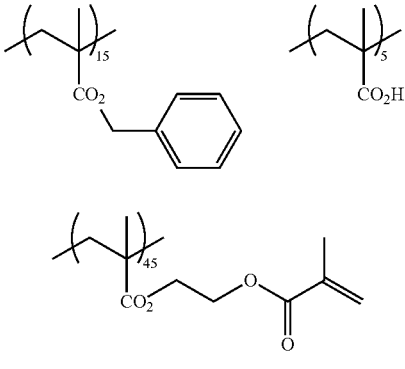 | 7200 |
| 7 | 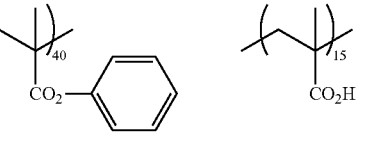 | 4600 |
-continued
| Polymer | Composition (% by mole) | Mw |
|---|---|---|
| | 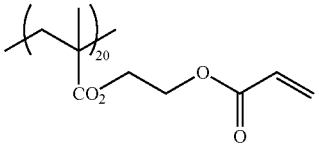 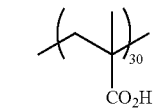 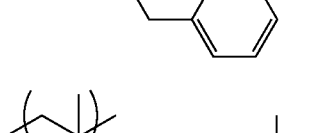 | |
| 8 | 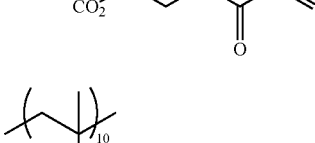 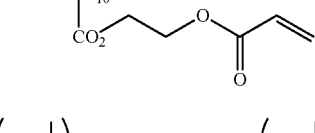 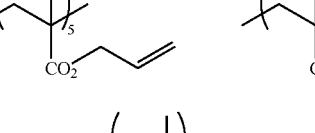 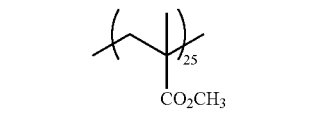 | 9700 |
| 9 | 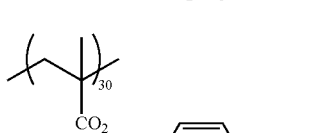 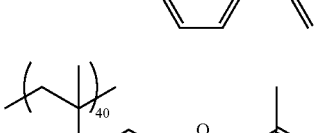 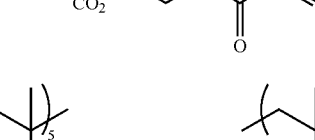 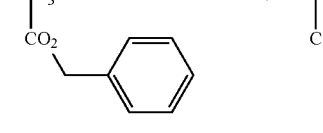 | 67000 |

-continued
| Polymer | Composition (% by mole) | Mw |
|---|---|---|
| 10 | 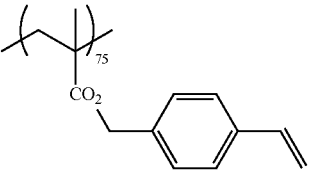 | 25000 |
| 11 | 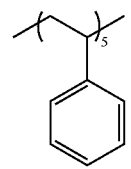 | 35000 |
| 12 | 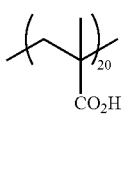 | 5600 |
| 13 | 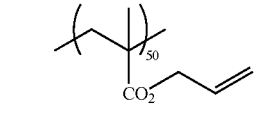 | 18000 |
-continued
| Polymer | Composition (% by mole) | Mw |
|---|---|---|
|  | 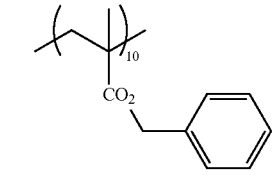 |  |
| 14 | 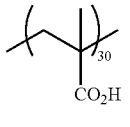 | 23000 |
| 15 | 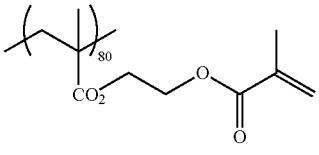 | 58000 |
| 16 | 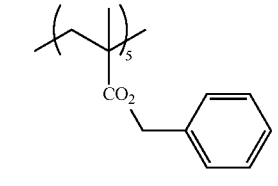 | 76000 |

| Polymer | Composition (% by mole) | Mw |
|---|---|---|
| 17 | 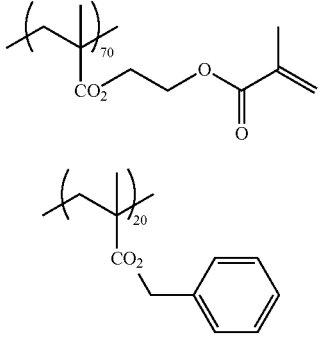 | 2300 |

From the point of good dispensability of pigment, a weight average molecular weight (Mw) of a binder polymer having an unsaturated double bond described above is preferably from 1,000 to 100,000, and more preferably from 5,000 to 50,000.

Further, the content of a binder polymer having such an unsaturated double bond based on the mass of a pigment in a polymerizable composition is preferably from 0.01% by mass to 40% by mass, and more preferably from 5% by mass to 30% by mass. In the case in which the content of a binder is less than 0.01% by mass, pigment dispersibility is insufficient. Thus an improvement effect of brightness is lowered. Further, when the content is over 40% by mass, an obtainable viscosity of a polymerizable composition is become higher, a thixotropy appears, and thus a coating adequacy is deteriorated.

A content of a (D) binder polymer of a polymerizable composition of the present invention is suitably determined according to the purpose of the binder polymer. However generally, with respect to a total solid content of the composition, from 5% by mass to 85% by mass is preferable, and from 10% by mass to 50% by mass is more preferable.

[(E) Solvent]

A polymerizable composition of the present invention includes a (E) solvent.

The (E) solvent is not specifically limited if it satisfies a solubility of each component of the polymerizable composition, or a coating property of the polymerizable composition, however it is preferable to select the solvent considering a safety.

Specific examples of a solvent, esters, for example, formic acid ester (for example amyl formate); acetic acid ester (for example ethyl acetate, n-butyl acetate, isobutyl acetate, iso amyl acetate, isobutyl acetate); oxo acetic acid ester (for example oxo acetic acid methyl ester, oxo acetic acid ethyl ester, oxo acetic acid butyl ester); methoxy acetic acid ester (for example methoxy acetic acid methyl ester, methoxy acetic acid ethyl ester, methoxy acetic acid butyl ester); ethoxy acetic acid ester (for example ethoxy acetic acid methyl ester, ethoxy acetic acid ethyl ester); aceto acetic acid ester (for example methyl aceto acetate, ethyl aceto acetate); propionic acid ester (for example butyl propionate); 3-oxy propionic acid ester (for example methyl 3-oxy propionate, ethyl 3-oxy propionate); 3-methoxy propionic acid ester (for example methyl 3-methoxy propionate, ethyl 3-methoxy propionate); 3-ethoxy propionic acid ester (for example methyl 3-ethoxy propionate, ethyl 3-ethoxy propionate); 2-oxy propionic acid ester (for example methyl 2-oxy propionate, methyl 2-oxy-2-methyl propionate, ethyl 2-oxy-2-methyl propionate, ethyl 2-oxy propionate, propyl 2-oxy propionate); 2-methoxy propionic acid ester (for example methyl 2-methoxy propionate, ethyl 2-methoxy propionate, propyl 2-methoxy propionate); 2-ethoxy propionic acid ester (for example methyl 2-ethoxy propionate, methyl 2-methoxy-2-methyl propionate, ethyl 2-ethoxy-2-methyl propionate, ethyl 2-ethoxy propionate); butyric acid ester (for example, isopropyl butyrate, ethyl butyrate, butyl butyrate); lactic acid ester (for example, methyl lactate, ethyl lactate); pyruvic acid ester (for example, methyl pyruvicate, ethyl pyruvicate, propyl pyruvicate); t-oxo butane acid ester (for example, methyl 2-oxo butanate, ethyl 2-oxo butanate) and so forth;

Ethers, for example, diethyleneglycol dimethyl ether, tetra hydro furan, ethyleneglycol monomethyl ether, ethyleneglycol mono ethyl ether, methyl cellosolve acetate, ethyl cellosolve acetate, diethyleneglycol monomethyl ether, diethyleneglycol mono ethyl ether, diethyleneglycol mono butyl ether, propylene glycol methyl ether, propylene glycol methyl ether acetate, propylene glycol ethyl ether acetate, propylene glycol propyl ether acetate and so forth;

ketones, for example, methyl ethyl ketone, cyclohexanone, 2-heptanone, 3-heptanone, methyl isobutyl ketone and so forth;

aromatic hydrocarbons, for example, toluene, xylene, ethyl benzene and so forth;

alcohol-based solvent, for example, ethyl alcohol, isopropyl alcohol, n-propyl alcohol, and so forth are preferable.

Among them, 3-ethoxy methyl propionate, ethyl 3-ethoxy propionate, ethyl cellosolve acetate, ethyl lactate, diethyleneglycol dimethyl ether, butyl acetate, methyl 3-methoxy propionate, 2-heptanone, cyclohexanone, ethyl carbitol acetate, butyl carbitol acetate, propylene glycol methyl ether, propylene glycol monomethyl ether acetate (PGMEA), and so forth are more preferable.

A content of the (E) solvent is, with respect to a total solid content of a polymerizable composition, from 20% by mass to 95% by mass is preferable, and from 25% by mass to 90% by mass is more preferable.

If the amount of solvent is in the above range, in a case in which a (C) coloring agent is a pigment, dispersion of the pigment is carry out homogeneously, and this range is also advantageous in the point of dispersing stability after dispersion.

[Other Component]

A polymerizable composition of the present invention preferably includes, together with components of the above (A) to (E) as essential components, a sensitizer, a polymerization inhibitor or other additives if required.

—(F) Sensitizer—

The polymerizable composition of the present invention preferably includes a (F) sensitizer together with a (A) specific oxime compound.

Examples of the sensitizer which may be used, include a spectral sensitizing dye, and a dyestuff or a pigment which interacts with a polymerization initiator by absorbing a light of light source.

Examples of the preferable spectral sensitizing dye or dyestuff include polynuclear aromatics (for example, pyrene, perylene, triphenylene), xanthenes (for example, fluorescein, eosin, erythrocin, rhodamine B, rose bengal), cyanines (for example, thia carbocyanine, oxacarbocyanine), merocyanines (for example, merocyanine, carbomerocyanine), thiazines (for example, thionine, methylene blue, toluidine blue), acridines (for example, acridine orange, chloroflavin, acriflavin), phthalocyanines (for example, phthalocyanine, metal phthalocyanine), porphyrins (for example, tetraphenylporphyrin, central metal-substituted porphyrin), chlorophylls (for example, chlorophyll, chlorophyllin, central metal-substituted chlorophyll), metal complexes (for example, the following compound), anthraquinones (for example anthraquinone), and scuariums (for example squarium).

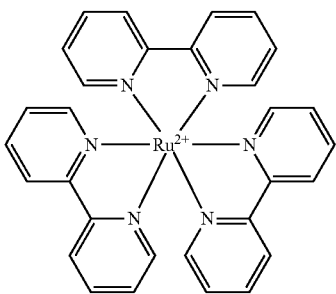

More preferable examples of the spectral sensitizing dye or dyestuff include those described in paragraphs [0144] to [0202] of JP-A No. 2006-78749.

The sensitizer may be used alone or together with two or more kinds thereof.

The molar ratio of the total amount of polymerization initiator (which includes a (A) specific oxime compound and other polymerization initiators) and a sensitizer in the polymerizable composition is from 100:0 to 1:99, more preferably from 90:10 to 10:90, and most preferably from 80:20 to 20:80.

—(G) Co-Sensitizer—

To the polymerizable composition of the present invention, a known compound that acts to further improve sensitivity, or acts to suppress polymerization inhibition due to oxygen, and so forth may be added as a co-sensitizer.

As for the co-sensitizer, a furan derivative described in Japanese Patent No. 4208437, or a benzothiazole derivative described in Japanese Patent No. 4190156 may be used.

In the case of using a co-sensitizer, with respect to 1 part by mass of a total amount of polymerization initiator included in the polymerizable composition of the present invention, it suitable to use the co-sensitizer in the range of from 0.01 parts by mass to 50 parts by mass.

—(H) Polymerization Inhibitor—

In order to prevent an unnecessary heat polymerization of a polymerizable monomer during preparation or preservation of the polymerizable composition, it is preferable that a small amount of heat polymerization inhibitor is added to the polymerizable composition of the present invention.

Examples of the heat polymerization inhibitor include hydroquinone, p-methoxy phenol, di-t-butyl-p-cresol, pyrogallol, t-butyl catechol, benzoquinone, 4,4'-thio bis(3-methyl-6-t-butyl phenol), 2,2'-methylenebis(4-methyl-6-t-butyl phenol), and N-nitroso phenylhydroxyamine cerium (I) salt.

An addition amount of the polymerization inhibitor is preferably from about 0.01% by mass to about 5% by mass with respect to a total solid content of the polymerizable composition.

Further, if necessary, in order to prevent a polymerization inhibition by oxygen, a higher fatty acid derivative such as behenic acid or behenic acid amide, and so forth may be added and in the drying process after coating, the higher fatty acid derivative may be set so as to be eccentrically located on the surface of a coating film. The amount of addition of a higher fatty acid derivative is preferably about 0.5% by mass to about 10% by mass with respect to the total composition.

—(I) Other Additive—

Further, for the improvement of a physical property of a cured coat, inorganic fillers or other known additives such as a plasticizer and so forth may be added.

Examples of the plasticizer include dioctyl phthalate, didodecyl phthalate, triethylene glycol dicaprylate, dimethyl glycol phthalate, tricresyl phosphate, dioctyl adipate, dibutyl sebacate, and triacetyl glycerin. In the case of using a binder, with respect to a total mass of a polymerizable monomer and the binder, the plasticizer may be added in an amount of 10% by mass or less.

Further, in order to improve film strength (printing durability) to be described later and to enhance an effect of heat and exposure after development, for example, UV initiator or heat crosslinking agent can be added.

<Color Filter and Method for Producing Thereof>

Next, a color filter of the present invention and a method for producing thereof are described.

A color filter of the present invention is characterized in that the color filter has a support and, on or above the support, a colored pattern which is formed by using a polymerizable composition of the present invention.

Hereinafter, with respect to a color filter of the present invention, it is explained in detail through a production method thereof (a method for producing a color filter of the present invention).

A method for producing a color filter of the present invention is characterized in that the method includes a process in which on or above a support, a polymerizable composition of the present invention is coated to form a polymerizable composition layer (polymerizable composition layer forming process), a process in which the polymerizable composition layer is exposed through a mask (exposure process), and a process in which after exposure, the above-described polymerizable composition layer is developed to form a colored pattern (development process).

Specifically, the method includes: coating a polymerizable composition of the present invention on or above a support by direct or through other layer to from a polymerizable composition layer (polymerizable composition layer forming process), and then exposing through a predetermined mask pattern to cure only a light-irradiation area (exposure process), and then developing a non-irradiated section with a developer (development process) to form a colored pattern (pixel) of each color (three colors or four colors) whereby a color filter of the present invention may be obtained.

Hereinafter, each process of the method for producing a color filter of the present invention is described.

[Polymerizable Composition Layer Forming Process]

In the polymerizable composition layer forming process, a polymerizable composition of the present invention is coated on or above a support to form a polymerizable composition layer.

Examples of the support which may be used in the present process include a soda glass, a PYREX® glass, a quartz glass and glasses on which a transparent conductive film is adhered, each of which is used for a liquid crystal display element or the like; and a photoelectric transformation element substrate which is used for an imaging device or the like, for example silicon substrate and so forth, or a complementary metal oxide semiconductor (CMOS) and so forth. These substrates may have a black stripe formed thereon to put each pixel in isolation.

Also, on this support, if necessary, an undercoating layer may be provided in order to improve adhesion to an upper layer, to prevent diffusion of material, or to planarize a substrate surface.

As for the coating method of the polymerizable composition of the present invention on or above a support, various coating method such as a slit coating, an inkjet method, a rotary coating, a cast coating, a roll coating, a screen printing method and so forth may be applied.

As for the coating film of the polymerizable composition, a range of from 0.1 µm to 10 µm is preferable, a range of from 0.2 µm to 5 µm is more preferable, and a range of from 0.2 µm to 3 µm is even more preferable.

Also, in a case in which a color filter used for solid-state imaging device is prepared, from the view point of resolution and developing property, as for the coating film formed by a polymerizable composition, a range of from 0.35 µm to 1.5 µm is preferable, and a range of from 0.40 µm to 1.0 µm is more preferable.

The polymerizable composition coated on or above a support is dried (prebaked) under the condition of generally at 70° C. to 110° C., for about 2 minutes to 4 minutes to form a polymerizable composition layer.

[Exposure Process]

In the exposure process, a polymerizable composition layer formed in a polymerizable composition layer forming process is exposed via a mask. Thereby, only a light-irradiated area of the polymerizable composition layer may be cured.

An exposure is preferably carried out by irradiation of radioactive rays.

As for the radioactive rays which may be used in exposure, radioactive rays which are capable of irradiating radioactive rays having wavelengths of 365 nm and 405 nm to which a (A) specific oxime compound shows particularly excellent sensitivity are preferable. In particular, ultraviolet rays such as g-rays, i-rays and so forth are preferably used. A high pressure mercury lamp is more preferred.

Irradiation strength in exposure is preferably a range of from 5 mJ/cm² to 1500 mJ/cm², more preferably from 10 mJ/cm² to 1000 mJ/cm² and most preferably from 10 mJ/cm² to 800 mJ/cm².

Development Step

After the exposure step, alkali development is performed so that the unexposed portion resulting from the exposure step can be dissolved in an aqueous alkali solution. In this step, only the photo-cured portion is left.

The liquid developer is preferably an organic alkali developer that does not damage underlying circuits or the like. The development is generally performed at a temperature of from 20° C. to 30° C. for a time period of from 20 seconds to 90 seconds.

Examples of the alkali for use in the liquid developer include ammonia water and organic alkaline compounds such as ethylamine, diethylamine, dimethylethanolamine, tetramethylammonium hydroxide, tetraethylammonium hydroxide, choline, pyrrole, piperidine, and 1,8-diazabicyclo-[5,4,0]-7-undecene wherein the aqueous alkaline solution is used by diluting the alkali with pure water to a concentration of from 0.001% by mass to 10% by mass, and preferably from 0.01% by mass to 1% by mass. When a liquid developer comprising such an aqueous alkaline solution is used, washing (rinsing) with pure water is generally performed after the development.

If necessary, the method of the invention for producing a color filter may further include the step of curing the colored pattern by heating and/or exposure to light after the polymerizable composition layer-forming step, the exposure step and the development step have been conducted.

The polymerizable composition layer-forming step, the exposure step and the development step (and optionally the curing step) may be repeated for the number of times corresponding to the number of the desired hues, whereby a color filter of the desired hues may be produced.

The color filter of the invention is produced with the polymerizable composition of the invention, and therefore, the thus-formed colored pattern exhibits excellent adhesion to the supporting substrate, and the cured composition has excellent resistance to development. Therefore, the exposure sensitivity is high, the adhesion to the substrate of the exposed portion is excellent, and a high-resolution pattern having a desired cross-sectional shape can be formed. Therefore, the color filter of the invention is suitable for use in liquid crystal displays and solid-state imaging devices such as CCDs and particularly suitable for use in high-resolution CCD devices or CMOS devices having more than a million pixels. Specifically, the color filter of the invention is preferably used for solid-state imaging devices.

For example, the color filter of the invention may be placed between the light-receiving part of each pixel of a CCD and a collecting microlens.

Hereinafter, the preferred aspects of the present invention are described, however the invention is not limited thereto.

<2> The polymerizable composition according to the above <1>, wherein $R^1$ of the above general formula (1) is a substituent represented by the following general formula (3).

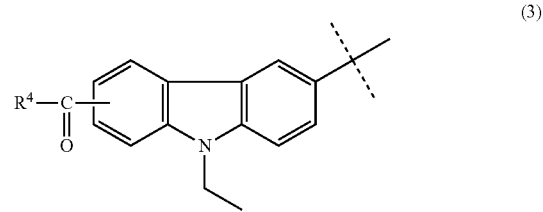

(3)

In the above general formula (3), $R^4$ represents an aromatic group.

<3> The polymerizable composition according to the above <1> or <2>, wherein the above (B) coloring agent is a pigment or a dyestuff.

<4> The polymerizable composition according to the above <3>, wherein the pigment or the dyestuff is in a range of from 50% by mass to 80% by mass with respect to a total solid content of the polymerizable composition.

<5> The polymerizable composition according to any one of the above <1> to <4>, wherein the above (C) polymerizable monomer has an acidic group.

<6> The polymerizable composition according to any one of the above <1> to <5>, wherein the above (D) binder polymer has a double bond.

<7> The polymerizable composition according to any one of the above <1> to <6>, further including (F) a sensitizer.

<8> The polymerizable composition according to the above <7>, further including (G) a co-sensitizer.

<9> A color filter including a support and, provided on or above the support, a colored pattern which has been formed using the polymerizable composition according to any one of the above <1> to <8>.

<10> A method for producing a color filter, the method including:

coating, on or above a support, a polymerizable composition according to any one of the above <1> to <8> to form a polymerizable composition layer;

exposing the polymerizable composition layer via a mask; and developing the exposed polymerizable composition layer to Balm a colored pattern.

<11> A solid-state imaging device, equipped with the color filter according to the above <9>.

EXAMPLES

Hereinafter, the invention will be described in more detail based on the Examples, however the invention is not limited to the following Examples unless it does not exceed main purpose.

Synthetic Example 1

Synthesis of Exemplified Compound (A-1)

30 mmol of diphenyl sulfide was dissolved in 100 mL of chloro benzene and cooled in an ice bath to an inner temperature of 5° C. To this, 33 mmol of aluminum chloride powder was added, and then stirred for 10 minutes. After that, 30.3 mmol of acetylchloride was added dropwise over 30 minutes. After setting back to room temperature, stirring was carried out for 3 hours. Then quenching was carried out with 500 g of ice. An organic layer was extracted with ethyl acetate, and then washed with a 1% aqueous hydrochloric acid and an aqueous sodium chloride, and then dried on the magnesium sulfate. Thereafter, a solvent was distilled and removed under reduced pressure. The obtained compound was 1-(4-(phenyl thio)phenyl)ethanone having the following structure. Further, the following reaction was carried out without purification.

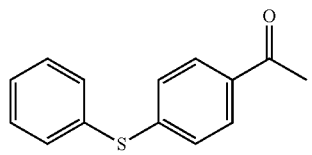 [SMILES: CC(=O)c1ccc(Sc2ccccc2)cc1]

20 mmol of 1-(4-(phenyl thio)phenyl)ethanone was dissolved in 100 mL of THF, and cooled at −78° C. To this, 22 mmol of lithium hexamethyldisilazide was added dropwise and stirred for 1 hour. Further, 20 mL of THF solution of 20 mmol of allyl bromide was added dropwise over 10 minutes and a solution temperature was slowly set back to room temperature, and further stirred for 1 hour. Then quenching was carried out with 100 mL of water. An organic layer was extracted with ethylacetate, and washed with an aqueous sodium chloride. Thereafter, the organic layer was concentrated. The thus-obtained mixture was purified by column chromatography (hexane/ethyl acetate=10/1). Thereby, 1-(4-(phenyl thio)phenyl)pent-4-en-1-one having the following structure was obtained with a yield of 52%.

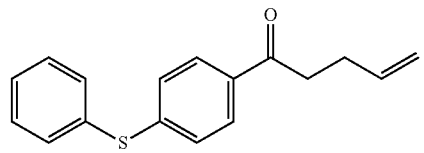 [SMILES: C=CCCC(=O)c1ccc(Sc2ccccc2)cc1]

7.7 mmol of hydrochloric acid hydroxyl ammonium and 10 mmol of sodium acetate were dissolved in 3 mL of water. To this, 10 mL of a propylene glycol monomethyl ether solution containing 7 mmol of 1-(4-(phenyl thio)phenyl)pento 4-en-1-one and was added. Then, the mixture was heated and stirred at 80° C. for 3 hours. The material extracted with ethyl acetate was washed with an aqueous sodium chloride. Thereafter, drying and concentration were performed. As a result of purification by a column chromatography (hexane/ethyl acetate=4/1), 1-(4-(phenyl thio)phenyl)pento-4-en-1-one oxime having the following structure was obtained with a yield of 78%.

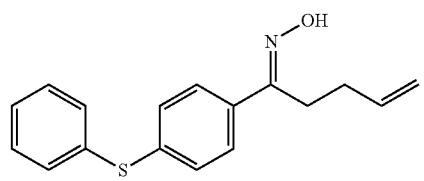 [SMILES: C=CCC/C(=N\O)c1ccc(Sc2ccccc2)cc1]

1 mmol of 1-(4-(phenyl thio)phenyl)pento-4-en-1-one oxime was dissolved in 20 mL of ethyl acetate, and further 1.5 mmol of triethyl amine was added thereto. After cooling to 0° C., 1.5 mmol of acetyl chloride was added and stirred at 0° C. for 1 hour. An organic layer was extracted with ethyl acetate and washed with an aqueous sodium chloride. After that, the organic layer was dried and concentrated. Furthermore, the concentrate was purified by column chromatography (hexane/ethyl acetate=4/1). As a result, 1-(4-(phenyl thio)phenyl) pento 4-en-1-one oxime-o-acetate having the following structure: exemplified compound (A-1) was obtained with a yield of 87%.

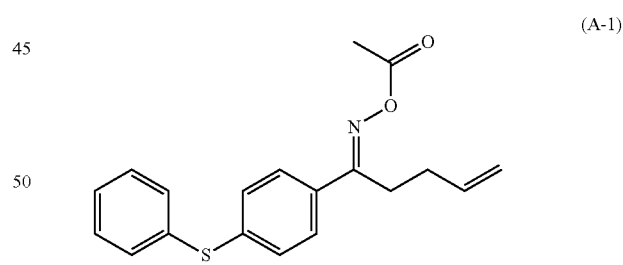

1H NMR data of the obtained exemplified compound (A-1) are as follows.

1H NMR (CDCl3): δ2.08 (s, 3H), 2.18 (dt, J=7.2 Hz, 7.0 Hz, 2H), 2.76 (t, J=7.2 Hz, 2H), 4.97 (dd, J=7.0 Hz, 2.4 Hz, 1H), 5.03 (dd, J=2.4 Hz, 18.0 Hz, 1H), 5.70 (dd, J=7.0 Hz, 18.0 Hz, 1H), 7.0-7.2 (m, 5H), 7.26 (d, 2H), 7.41 (d, 2H)

Synthetic Example 2

Synthesis of Exemplified Compound (A-31)

100 mmol of N-ethyl carbazole was dissolved in 300 mL of chloro benzene and cooled in an ice bath to an inner temperature of 5° C. To this, 110 mmol of aluminum chloride powder was added, and then stirred for 10 minutes. After that, 105 mmol of o-tolylcarboxylic acid chloride was added and stirred at room temperature for 2 hours. After cooling again to 5° C., 110 mmol of an aluminum chloride powder was added and further 110 mmol of an acetyl chloride was added dropwise over 30 minutes. Setting back to room temperature, stirring was carried out for 3 hours. Then, quenching was carried out with 500 g of ice. An organic layer was extracted with ethyl acetate and then washed with a 1% aqueous hydrochloric acid and an aqueous sodium chloride, and then dried on the magnesium sulfate. A solvent was distilled and removed under reduced pressure. The obtained compound was N-ethyl-3-acetyl-6-(o-tolyl)carbonyl carbazole having the following structure. Further, the following reaction was carried out without purification.

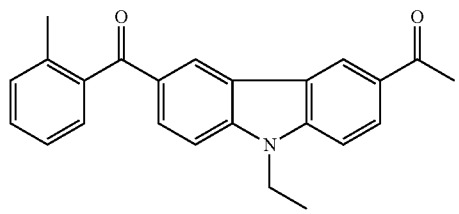 [SMILES: CCn1c2ccc(C(C)=O)cc2c2cc(C(=O)c3ccccc3C)ccc21]

20 mmol of N-ethyl-3-acetyl-6-(o-tolyl)carbonyl carbazole was dissolved in 100 mL of THF, and cooled at −78° C. To this, 22 mmol of lithium hexamethyl disilazid was added dropwise. Stirring was carried out for 1 hour. Further, 20 mL of a THF solution of 20 mmol of 1-bromo-4-butene was added dropwise over 10 minutes, and a solution temperature was slowly set back to room temperature. Further, stirring was carried out for 1 hour. Then, quenching was carried out with 100 mL of water. An organic layer was extracted with ethyl acetate, and washed with an aqueous sodium chloride. Thereafter, the organic layer was concentrated. The thus-obtained mixture was purified by column chromatography (hexane/ethyl acetate=4/1). As a result, N-ethyl-3-(5-hexene-1-one)-6-(o-tolyl)carbonyl carbazole having the following structure was obtained with a yield of 33%.

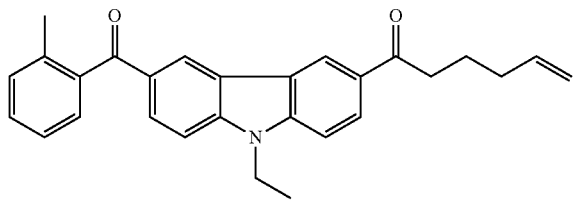 [SMILES: C=CCCCC(=O)c1ccc2c(c1)c1cc(C(=O)c3ccccc3C)ccc1n2CC]

3 mmol of N-ethyl-3-(5-hexene-1-one)-6-(o-tolyl)carbonyl carbazole was dissolved in THF 20 mL and cooled to 0° C. To this, 10 mL of a methanol solution of 3.3 mmol of sodium methoxide was added and stirred at the same temperature for 1 hour. To this, 3.3 mmol of isopentyl nitrite was added and further stirred at room temperature for 1 hour. The thus-obtained solution was poured into a 0.1N aqueous hydrochloric acid which was cooled to 0° C. The precipitated solid was filtered and taken out. Further, the precipitate was washed with distilled water, and then dried. As a result, N-ethyl-3-(5-hexene-1-one)-6-(o-tolyl)carbonyl carbazole oxime having the following structure was obtained with a yield of 67%.

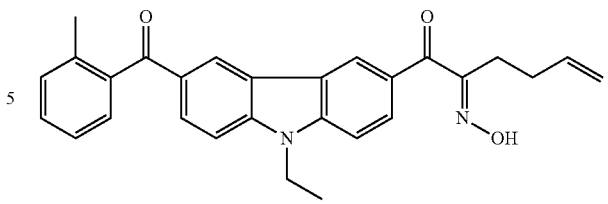

1 mmol of N-ethyl-3-(5-hexene-1-one)-6-(o-tolyl)carbonyl carbazole oxime was dissolved in 20 mL of ethyl acetate, and further 1.5 mmol of triethyl amine was added thereto. After cooling to 0° C., 1.5 mmol of an acetyl chloride was added and stirred at 0° C. for 1 hour. An organic layer was extracted with ethyl acetate, washed with an aqueous sodium chloride, dried and concentrated. Further, the concentrate was purified by a column chromatography (hexane/ethyl acetate=4/1). As a result, N-ethyl-3-(5-hexene-1-one)-6-(o-tolyl)carbonyl carbazole oxime acetate having the following structure: exemplified compound (A-31) was obtain with a yield of 91%.

(A-31)

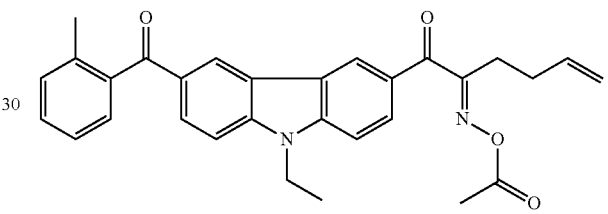

Thus-obtained exemplified compound (A-31)
1H NMR data are as follows.
1H NMR (CDCl3): δ1.51 (t, J=7.2 Hz, 3H), 2.08 (s, 3H), 2.35 (s, 3H), 2.45 (d, J=6.8 Hz, 2H), 2.55 (d, J=6.8 Hz, 2H), 3.89 (q, J=7.2 Hz, 2H), 5.07 (dd, J=7.0 Hz, 2.4 Hz, 1H), 5.15 (dd, J=2.4 Hz, 18.0 Hz, 1H), 6.08 (dd, J=7.0 Hz, 18.0 Hz, 1H), 7.3-7.5 (m, 7H), 8.03 (d, J=5.8 Hz, 1H), 8.19 (d, J=5.8 Hz, 1H)

Example 1-1

A photopolymerizable composition 1 used for a sensitivity measure of Example 1-1 was prepared as follows, and the sensitivity was evaluated.

A homogeneous composition including 0.08 mmol of exemplified compound (A-1) synthesized as the above described as (A) specific oxime compound, 1 g of a pentaerythritol tetra acrylate as (C) polymerizable monomer, 1 g of poly methyl methacrylate (POLY METHYL METHACRYLATE manufactured by Aldrich Co., molecular weight c.a.996000) as (D) binder polymer, and, 16 g of a cyclohexanone as (E) solvent was prepared. The obtained composition was used as a coating liquid and coated on a glass plate by a spin coater, and then dried at 40° C. for 10 minutes so that a coated film with 1.5 μm of film thickness was formed. A 21√2 STEP TABLET (trade name, manufactured by Dainippon Screen Mfg. Co., Ltd., gray-scale film) was put on the coated film, and then the coated film was exposed to a light emitted from 500 mW of HIGH PRESSURE MERCURY LAME manufactured by Ushio Inc for 30 seconds through a heat-ray cut filter. After that, it was impregnated in a toluene for 60 seconds to carry out a developing treatment. Sensitivity was evaluated according to the number of steps of insolubilization due to complete curing, the number of steps corresponding to the step tablet. The sensitivity was step 9.

Further, with respect to the step of sensitivity, the higher number of step indicates the higher sensitivity.

Example 1-2 to Example 1-8, Comparative Example 1-1 to Comparative Example 1-4

Photopolymerizable compositions 2 to 12 for sensitivity measurement were prepared in the same manner as in Example 1-1, except that compound (A-1) of Example 1-1 was substituted by each of the compounds (compound (A-2) to (A-8), comparative compounds 1 to 4) shown in the following Table 1. Further, with respect to the photopolymerizable compositions 2 to 12, a sensitivity step was evaluated in the same manner as in Example 1-1.

The evaluation results of Example 1-1 to Example 1-8, and Comparative Example 1-1 to Comparative Example 1-4 are shown in the following Table 1.

TABLE 1

| | Specific oxime compound, or comparative compound | Photopolymerizable composition | Sensitivity step |
|---|---|---|---|
| Example1-1 | (A-1) | 1 | 9 |
| Example1-2 | (A-2) | 2 | 8 |
| Example1-3 | (A-3) | 3 | 9 |
| Example1-4 | (A-4) | 4 | 7 |
| Example1-5 | (A-5) | 5 | 9 |
| Example1-6 | (A-6) | 6 | 9 |
| Example1-7 | (A-7) | 7 | 6 |
| Example1-8 | (A-8) | 8 | 6 |
| Comparative Example1-1 | comparative compound 1 | 9 | 5 |
| Comparative Example1-2 | comparative compound 2 | 10 | 5 |
| Comparative Example1-3 | comparative compound 3 | 11 | 4 |
| Comparative Example1-4 | comparative compound 4 | 12 | 5 |

In the above Table 1, the details and structural formulae of the comparative compounds (comparative compounds of 1 to 4) are as follows.

Comparative compound 1: IRGACURE OXE01 (trade name, manufactured by Ciba Specialty Chemicals K.K. Japan)

Comparative compound 2: IRGACURE OXE02 (trade name, manufactured by Ciba Specialty Chemicals K.K. Japan)

Comparative compound 3: IRGACURE369 (trade name, manufactured by Ciba Specialty Chemicals K.K. Japan). The structural formulae of the comparative compound 1 to the comparative compound 3 are shown below.

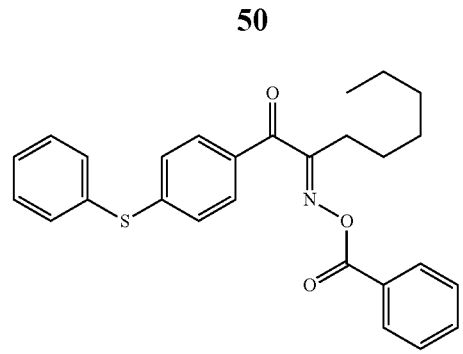

IRGACURE OXE 01

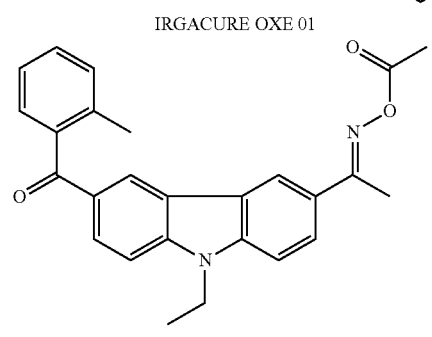

IRGACURE OXE 02

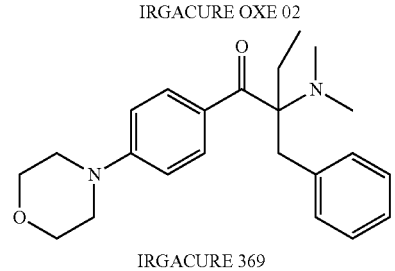

IRGACURE 369

The structure of comparative compound 4 is shown below.

Comparative compound 4

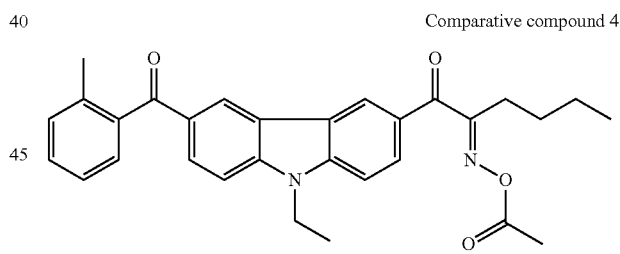

Example 2-1

1. Preparation of Polymerizable Composition S-1 of the Invention

A polymerizable composition S-1 containing a colorant (pigment) was prepared. A color filter was prepared using the composition.

1-1. Preparation of Pigment Dispersion Liquid (P1)

A liquid mixture composed of 40 parts by mass of a pigment mixture of C.I. Pigment Green 36 and C.I. Pigment Yellow 219 (30/70 in mass ratio), 10 parts by mass (4.51 parts by mass in terms of solid content) of BYK 2001 (DISPER-BYK, manufactured by BYK-Chemie, 45.1% by mass in solids content) as a dispersing agent, and 150 parts by mass of ethyl 3-ethoxypropionate as a solvent was mixed and dispersed in a bead mill for 15 hours so that a pigment dispersion liquid (P1) was prepared.

The average particle size of the pigment in the resulting pigment dispersion liquid (P1) was measured by dynamic light scattering. The average particle size was 200 nm.

1-2. Preparation of Polymerizable Composition S-1 (Coating Liquid)

The components for Composition S-1 shown below were mixed and dissolved to form a polymerizable composition S-1.

<Composition S-1>

| | |
|---|---|
| (B) Coloring Agent: Pigment Dispersion Liquid (P1) | 600 parts by mass |
| (D) Binder Polymer: Polymer O (Benzyl methacrylate/methacrylic acid/ hydroxyethyl methacrylate copolymer, molar ratio: 80/10/10, Mw: 10,000) | 200 parts by mass |
| (C) Polymerizable monomer: Exemplified Compound (C—O) (dipentaerythritol hexaacrylate) | 60 parts by mass |
| (A) Specific oxime compound: Exemplified Compound (A-1) | 60 parts by mass |
| (E) Solvent: propylene glycol monomethyl ether acetate | 1,000 parts by mass |
| Surfactant (trade name: TETRANIC 150R1, BASF) | 1 part by mass |
| γ-methacryloxypropyltriethoxysilane | 5 parts by mass |

[2. Preparation of Color Filter]

2-1. Formation of Polymerizable Composition Layer

The thus-obtained pigment-containing polymerizable composition S-1 was, as a resist solution, coated on a glass substrate of 550 mm×650 mm by slit coating under the conditions described below and then allowed to stand for 10 minutes. The solution was then dried under vacuum and pre-baked (100° C. for 80 seconds) to form a polymerizable composition layer.

(Slit Coating Conditions)

Opening gap of the top of the coating head: 50 μm
Coating speed: 100 mm/second
Clearance between the substrate and the coating head: 150 μm
Coating thickness (dry thickness): 2 μm
Coating temperature: 23° C.

2-2. Exposure and Development

The polymerizable composition layer was then patternwise exposed to light from a 2.5 kW ultra-high pressure mercury lamp through a mask. After the exposure to light, the entire surface of the exposed composition layer was covered with an aqueous 10% solution of a liquid organic developer (trade name: CD, manufactured by Fuji Film Electronics Materials Co., Ltd.) and allowed to stand for 60 seconds.

2-3. Heat Treatment

A shower of pure water was then sprayed on the composition layer so that the liquid developer was washed away. The composition was then heated in an oven at 220° C. for 1 hour (post-baking) so that a color filter having a colored pattern on the glass substrate was obtained.

3. Performance Evaluation

Evaluations were performed as described below with respect to storage stability and exposure sensitivity of the polymerizable composition S-1, the developability of a colored pattern formed on a glass substrate by using the polymerizable composition S-1, staining of the obtained colored pattern due to heating with time, adhesion of the colored pattern to the substrate, and a cross-sectional shape of the pattern. A summary of the evaluation results is shown in Table 4.

3-1. Storage Stability of Polymerizable Composition

After the polymerizable composition was stored at room temperature for one month, the degree of precipitation of foreign materials was visually evaluated according to the following criteria:

A: No precipitation was observed;
B: Precipitation was slightly observed;
C: Precipitation was observed.

3-2. Exposure Sensitivity of Polymerizable Composition

The polymerizable composition was coated on a glass substrate by spin coating and then dried to form a coating film with a thickness of 1.0 μm. Spin coating conditions were 300 rpm for 5 seconds and then 800 rpm for 20 seconds. Drying conditions were 100° C. for 80 seconds. The resulting coating film was then exposed to light through a test photomask with a line width of 2.0 μm at different exposure amounts in the range of 10 mJ/cm$^2$ to 1,600 mJ/cm$^2$ using a proximity-type exposure system equipped with a ultra-high pressure mercury lamp (manufactured by Hitachi High-Tech Electronics Engineering Co., Ltd.). The exposed coating film was then developed with a liquid developer 60% CD-2000 (manufactured by Fuji Film Electronics Materials Co., Ltd.) at 25° C. for 60 seconds. Thereafter, the film was rinsed with running water for 20 seconds and then spray-dried so that the patterning was completed.

Regarding the evaluation of exposure sensitivity, the minimum exposure requirement amount at which the post-development thickness of the region that was irradiated with light in the exposure step became 95% or more of the thickness (100%) of the film before the exposure was evaluated as the exposure sensitivity. The smaller exposure requirement amount indicates the higher sensitivity.

3-3. Developability, Cross-Sectional Shape of Pattern, Adhesion to Substrate

After the post-baking described in the section 2-3 "Heat Treatment", the surface and the cross-sectional shape of the substrate were observed by common methods using an optical microscope and observing SEM photographs, so as to evaluate the developability, the adhesion to the substrate and the cross-sectional shape of the pattern. The details of the evaluation method are described below.

<Developability>

The presence or absence of residues in the region (unexposed portion) which was not irradiated with light in the exposure step was observed, so as to evaluate the developability. The evaluation was preformed according to the following criteria:

○: No residue was observed in the unexposed portion;
Δ: Residues were slightly observed in the unexposed portion, but the residue level was practically not problematic;
X: Residues were significantly observed in the unexposed portion.

Adhesion to Substrate

Adhesion to the substrate was evaluated by observing the presence or absence of pattern defects according to the following criteria:

○: No pattern defect was observed;
Δ: Pattern defects were hardly observed but observed in part;
X: Many pattern defects were significantly observed.

<Cross-Sectional Shape of Pattern>

The cross-sectional shape of the pattern was observed and evaluated. The cross-sectional shape of the pattern is preferably rectangular, most preferably forward-tapered. The inversely-tapered shape is not preferred.

3-4. Staining Due to a Compulsory Heating with Time

After post-baking according to the method of "2-3 Heating Treatment", a color filter having a colored pattern was heated at 200° C. on a hot plate for 1 hour. The color differences ΔEab* of before and after heating was measured by MCPD-3000 (trade name, manufactured by Otsuka Electronics Co., Ltd). The measured color difference ΔEab* of before and after heating was evaluated based on the following criteria.
—Evaluation Criteria—
○: ΔEab*≦5
Δ: 5<ΔEab*<8
X: ΔEab*≧8

Examples 2-2 to 2-15, Comparative Examples 2-1 to 2-4

The polymerizable compositions S-2 to S-15 and S'-1 to S'-4 were prepared and a color filters were obtained exactly in the same as in Example 2-1, except that, in the composition S-1 which was used in the preparation of polymerizable composition S-1 of Example 2-1, "(A) Specific oxime compound: Exemplified Compound (A-1) 60 parts by mass" was appropriately changed to "each of compounds and amounts shown in the following Table 2", and further "(D) Binder Polymer: Polymer O" and "(C) Polymerizable monomer: Exemplified Compound (C—O)" were appropriately changed to "the kind shown in the following Table 2", and further appropriately, a sensitizer and a co-sensitizer were added. Further, evaluation was carried out in the same manner as in Example 2-1. The results are shown in Table 2.

TABLE 2

| | compo-sition | Specific oxime compound or comparative compound kind | content (parts by mass) | binder polymer kind | polymerizable monomer kind | sensitizer kind | content (parts by mass) | co-sensitizer kind | content (parts by mass) |
|---|---|---|---|---|---|---|---|---|---|
| Ex. 2-1 | S-1 | (A-1) | 60 | polymer-0 | (C-0) | — | — | — | — |
| Ex. 2-2 | S-2 | (A-2) | 60 | polymer-0 | (C-0) | — | — | — | — |
| Ex. 2-3 | S-3 | (A-3) | 60 | polymer-0 | (C-1) | — | — | — | — |
| Ex. 2-4 | S-4 | (A-4) | 60 | polymer-0 | (C-2) | — | — | — | — |
| Ex. 2-5 | S-5 | (A-5) | 60 | polymer-0 | (C-3) | — | — | — | — |
| Ex. 2-6 | S-6 | (A-6) | 60 | polymer-1 | (C-4) | — | — | — | — |
| Ex. 2-7 | S-7 | (A-7) | 60 | polymer-2 | (C-5) | — | — | — | — |
| Ex. 2-8 | S-8 | (A-8) | 30 | polymer-3 | (C-6) | A1 | 30 | — | — |
| Ex. 2-9 | S-9 | (A-9) | 30 | polymer-4 | (C-7) | A2 | 30 | — | — |
| Ex. 2-10 | S-10 | (A-10) | 30 | polymer-5 | (C-0) | A3 | 30 | — | — |
| Ex. 2-11 | S-11 | (A-11) | 60 | polymer-6 | (C-0) | — | — | — | — |
| Ex. 2-12 | S-12 | (A-12) | 30 | polymer-7 | (C-8) | — | — | F1 | 30 |
| Ex. 2-13 | S-13 | (A-13) | 20 | polymer-8 | (C-9) | A2 | 20 | F1 | 20 |
| Ex. 2-14 | S-14 | (A-14) | 20 | polymer-9 | (C-10) | A2 | 20 | F2 | 20 |
| Ex. 2-15 | S-15 | (A-15) | 20 | polymer-10 | (C-11) | A2 | 20 | F3 | 20 |
| Comp. Ex. 2-1 | S'-1 | comparative compound1 | 60 | polymer-0 | (C-0) | — | — | — | — |
| Comp. Ex. 2-2 | S'-2 | comparative compound2 | 60 | polymer-0 | (C-0) | — | — | — | — |
| Comp. Ex. 2-3 | S'-3 | comparative compound3 | 60 | polymer-0 | (C-0) | — | — | — | — |
| Comp. Ex. 2-4 | S'-4 | comparative compound4 | 60 | polymer-0 | (C-0) | — | — | — | — |

| | Storage stability | Exposure sensitivity (mJ/cm$^2$) | Developing property | Staining due to heating with time | Adhesion to substrate | P.S. |
|---|---|---|---|---|---|---|
| Ex. 2-1 | ○ | 120 | ○ | ○ | ○ | :*1 |
| Ex. 2-2 | ○ | 110 | ○ | ○ | ○ | *2 |
| Ex. 2-3 | ○ | 90 | ○ | ○ | ○ | *2 |
| Ex. 2-4 | ○ | 100 | ○ | ○ | ○ | *1 |
| Ex. 2-5 | ○ | 110 | ○ | ○ | ○ | *1 |
| Ex. 2-6 | ○ | 90 | ○ | ○ | ○ | *2 |
| Ex. 2-7 | ○ | 100 | ○ | ○ | ○ | *1 |
| Ex. 2-8 | ○ | 90 | ○ | ○ | ○ | *2 |
| Ex. 2-9 | ○ | 80 | ○ | ○ | ○ | *1 |
| Ex. 2-10 | ○ | 80 | ○ | ○ | ○ | *1 |
| Ex. 2-11 | ○ | 90 | ○ | ○ | ○ | *1 |
| Ex. 2-12 | ○ | 80 | ○ | ○ | ○ | *1 |
| Ex. 2-13 | ○ | 80 | ○ | ○ | ○ | *1 |
| Ex. 2-14 | ○ | 70 | ○ | ○ | ○ | *1 |
| Ex. 2-15 | ○ | 70 | ○ | ○ | ○ | *1 |
| Comp. Ex. 2-1 | ○ | 170 | ○ | Δ | ○ | *2 |
| Comp. Ex. 2-2 | ○ | 160 | ○ | X | Δ | *2 |

TABLE 2-continued

| | | | | | | | |
|---|---|---|---|---|---|---|---|
| Comp. Ex. 2-3 | ○ | 200 | ○ | ○ | Δ | *3 | |
| Comp. Ex. 2-4 | ○ | 180 | ○ | Δ | Δ | *3 | |

In the above Table,
"Ex." refers to Example;
"Comp. Ex." refers to "Comparative Example";
"P.S." refers to Pattern shape;
"*1" refers to Forward taper;
"*2" refers to Rectangle; and
"*3" refers to Inverse taper.
These references are also applied to the other tables shown below.

Here, the polymers 1 to 10 used as a binder polymer in Table 2 refer to the exemplified specific compounds having a structural units represented by general formulae (21) to (23) described above.

Further, (C-1) to (C-11) used as a polymerizable monomer in Table 2 refer to the exemplified compounds (C-1) to (C-11) described above as a polymerizable monomer.

Sensitizers A1 to A3, co-sensitizers F1 to F3 shown in Table 2 were compound shown below.

A1: 4,4-bisdiethylaminobenzophenone
A2: Diethylthioxanthone
A3:

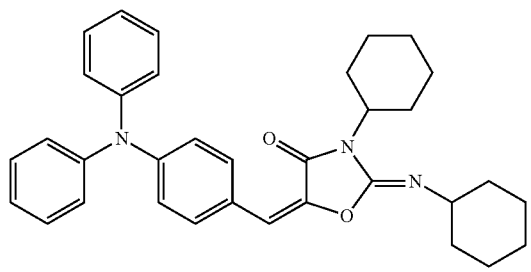 [SMILES: O=C1/C(=C\c2ccc(N(c3ccccc3)c3ccccc3)cc2)O/C(=N\C2CCCCC2)N1C1CCCCC1]

F1: 2-mercaptobenzimidazole
F2: 2-mercaptobenzothiazole
F3: N-phenyl-2-mercaptobenzimidazole The results of Table 4 indicate that the polymerizable composition of each Example containing the specific oxime compound (each of Exemplified Compounds (A-1) to (A-8) has high storage stability (stability over time). It is also apparent that these polymerizable compositions have high exposure sensitivity, show high developability in the process of forming colored patterns for a color filter and less staining (discoloration) of the obtained colored pattern due to heating with time, and form a colored pattern with excellent adhesion to the substrate and with an excellent cross-sectional shape.

Example 3-1

1. Preparation of Resist Liquid

The components for the composition described below were mixed and dissolved to form a resist liquid.

—Composition of Resist Liquid—

| | |
|---|---|
| Propylene glycol monomethyl ether acetate (PGMEA) | 19.20 parts by mass |
| Ethyl lactate | 36.67 parts by mass |
| Resin [a 40% PGMEA solution of a benzyl methacrylate/methacrylic acid/2-hydroxyethyl methacrylate (molar ratio = 60/22/18) copolymer] | 30.51 parts by mass |
| Dipentaerythritol hexaacrylate | 12.20 parts by mass |
| Polymerization inhibitor (p-methoxyphenol) | 0.0061 parts by mass |
| Fluorosurfactant (F-475, manufactured by Dainippon Ink and Chemicals, Incorporated) | 0.83 parts by mass |
| Photopolymerization initiator (TAZ-107 (trihalomethyltriazine-based photopolymerization initiator), manufactured by Midori Kagaku Co., Ltd.) | 0.586 parts by mass |

[2. Preparation of Silicon Wafer Substrate having Undercoat Layer]

A 6 inch silicon wafer was heated in an oven at 200° C. for 30 minutes. The resist liquid was coated on the silicon wafer so as to provide a dry thickness of 2 μm and then heated and dried in an oven at 220° C. for 1 hour to form an undercoat layer. As a result, an silicon wafer substrate having provided thereon an undercoat layer was obtained.

[3. Preparation of Polymerizable Composition T-1]

The compounds for the composition T-1 described below were mixed and dissolved to form a colorant (dye)-containing polymerizable composition T-1.

Composition T-1

| | |
|---|---|
| (E) Solvent: Cyclohexanone | 80 parts by mass |
| (B) Colorant: C.I. Acid Blue 108 | 7.5 parts by mass |
| (B) Colorant: C.I. Solvent Yellow 162 | 2.5 parts by mass |
| (C) Polymerizable monomer: Mixture (C—O') (a mixture of pentaerythritol triacrylate and dipentaerythritol hexaacrylate (3:7)) | 7.0 parts by mass |
| (A) Specific oxime compound: Exemplified Compound (A-1) | 2.5 parts by mass |
| Glycerol propoxylate (number average molecular weight Mn: 1,500, molar absorption coefficient ε = 0) | 0.5 parts by mass |

[4. Evaluation of Storage Stability of Polymerizable Composition T-1 (Coating Liquid)]

After the polymerizable composition T-1 was stored at room temperature for 1 month, the degree of precipitation of foreign materials was visually evaluated according to the criteria below. The results are shown in Table 5.

—Criteria—
○: No precipitation was observed;
Δ: Precipitation was slightly observed;
X: Precipitation was observed.

[5. Preparation of Color Filter by using Polymerizable Composition T-1 and Evaluation Thereof]

The polymerizable composition T-1 prepared in the above-described section 3 was coated on the undercoat layer of the silicon wafer substrate having provided thereon an undercoat layer obtained in the above-described section 2 so that a photo-setting coating film was formed. The coating film was then heated (pre-baked) with a hot plate at 100° C. for 120 seconds so as to provide a dry thickness of 0.9 μm.

The film was then exposed to light of a wavelength of 365 nm through a mask having a 2 μm square island pattern at exposure amounts in the range of from 10 to 1,600 mJ/cm$^2$ using an i-line stepper exposure system (trade name: FPA-3000i5+, manufactured by Cannon Inc.).

The silicon wafer substrate having provided thereon the irradiated coating film was then mounted on a horizontal rotary table of a spin-shower developing machine (trade name: Model DW-30, manufactured by Chemitronics Co., Ltd.) and subjected to a paddle development process at 23° C. for 60 seconds with CD-2000 (trade name, manufactured by Fuji Film Electronics Materials Co., Ltd.) so that a colored pattern was formed on the silicon wafer substrate.

The silicon wafer substrate having provided thereon the colored pattern was fixed on the horizontal rotary table by vacuum chucking. The colored pattern was rinsed with a shower of pure water supplied from above the rotation center by using a spray nozzle, while the silicon wafer substrate was rotated at a rotation number of 50 rpm by means of a rotator, and then the colored pattern was spray-dried.

As a result, a color filter comprising the colored pattern formed on a substrate was obtained.

<Exposure Sensitivity and Size of Pattern>

The minimum exposure amount at which the post-development thickness of the region that was irradiated with light in the exposure step became 95% or more of the thickness (100%) of the film before the exposure was evaluated as the exposure requirement amount. The smaller exposure requirement amount indicates the higher sensitivity.

In this process, the size of the colored pattern was measured using a length measuring SEM (trade name: S-9260A, manufactured by Hitachi High-Technologies Corporation). The closer to 2 μm in pattern size indicates the more sufficient curing and the higher sensitivity. The results are shown in Table 5.

Developability, Staining due to Heating with Time, Adhesion to Substrate, and Cross-Sectional Shape of Pattern Developability, staining due to heating with time, adhesion to the substrate and the cross-sectional shape of the pattern were evaluated according to the methods and the criteria used in Example 2-1. The results are shown in Table 5 below.

Examples 3-2 to 3-9, Comparative Examples 3-1 to 3-4

The polymerizable compositions T-2 to T-9 and T'-1 to T'-4 were prepared and color filters were obtained in the same as in Example 3-1, except that, in the composition T-1 which was used in the preparation of polymerizable composition T-1 of Example 3-1, "(A) Specific oxime compound: Exemplified Compound (A-1) 7.0 parts by mass" was changed to "each of compounds and amounts shown in the following Table 3", and further appropriately "(C) Polymerizable monomer: Mixture (C—O)" was changed to "the kind of monomer represented by the following Table 3", and further appropriately, a sensitizer and a cosensitizer were added. Further, evaluation was carried out in the same manner as in Example 2-1. The results are shown in Table 3.

TABLE 3

| | composition | Specific oxime compound or comparative compound kind | content (parts by mass) | polymerizable monomer kind | sensitizer kind | content (parts by mass) | co-sensitizer kind | content (parts by mass) |
|---|---|---|---|---|---|---|---|---|
| Ex. 3-1 | T-1 | (A-1) | 2.5 | (C-0') | — | — | — | — |
| Ex. 3-2 | T-2 | (A-2) | 2.5 | (C-0') | — | — | — | — |
| Ex. 3-3 | T-3 | (A-3) | 2.5 | (C-1) | — | — | — | — |
| Ex. 3-4 | T-4 | (A-4) | 2.5 | (C-2) | — | — | — | — |
| Ex. 3-5 | T-5 | (A-5) | 2.5 | (C-3) | — | — | — | — |
| Ex. 3-6 | T-6 | (A-6) | 2.5 | (C-4) | — | — | — | — |
| Ex. 3-7 | T-7 | (A-7) | 2.5 | (C-5) | — | — | — | — |
| Ex. 3-8 | T-8 | (A-8) | 2.5 | (C-6) | — | — | — | — |
| Ex. 3-9 | T-9 | (A-9) | 1.5 | (C-7) | A3 | 0.5 | F3 | 0.5 |
| Comp. Ex. 3-1 | T'-1 | comparative compound 1 | 2.5 | (C-0') | — | — | — | — |
| Comp. Ex. 3-2 | T'-2 | comparative compound 2 | 2.5 | (C-0') | — | — | — | — |
| Comp. Ex. 3-3 | T'-3 | comparative compound 3 | 2.5 | (C-0') | — | — | — | — |
| Comp. Ex. 3-4 | T'-4 | comparative compound 4 | 2.5 | (C-0') | — | — | — | — |

| | Storage stability | Exposure sensitivity (mJ/cm$^2$) | Pattern size (μm) | Developing property | Staining due to heating with time | Adhesion to substrate | Pattern shape |
|---|---|---|---|---|---|---|---|
| Ex. 3-1 | ○ | 1100 | 1.95 | ○ | ○ | ○ | Forward taper |
| Ex. 3-2 | ○ | 1000 | 1.94 | ○ | ○ | ○ | Rectangle |
| Ex. 3-3 | ○ | 800 | 1.96 | ○ | ○ | ○ | Forward taper |
| Ex. 3-4 | ○ | 900 | 1.91 | ○ | ○ | ○ | Rectangle |
| Ex. 3-5 | ○ | 1000 | 1.94 | ○ | ○ | ○ | Rectangle |
| Ex. 3-6 | ○ | 1000 | 1.95 | ○ | ○ | ○ | Rectangle |
| Ex. 3-7 | ○ | 900 | 1.95 | ○ | ○ | ○ | Rectangle |
| Ex. 3-8 | ○ | 800 | 1.94 | ○ | ○ | ○ | Rectangle |
| Ex. 3-9 | ○ | 700 | 1.97 | ○ | ○ | ○ | Rectangle |

TABLE 3-continued

| | | | | | | | | |
|---|---|---|---|---|---|---|---|---|
| Comp. Ex. 3-1 | ○ | 1300 | 1.91 | ○ | Δ | ○ | Rectangle | |
| Comp. Ex. 3-2 | ○ | 2100 | 1.91 | ○ | X | Δ | Rectangle | |
| Comp. Ex. 3-3 | ○ | 1500 | 1.90 | ○ | ○ | Δ | Inverse taper | |
| Comp. Ex. 3-4 | ○ | 1900 | 1.93 | ○ | Δ | Δ | Inverse taper | |

Also, the (C-1) to (C-7) used as a polymerizable monomer in Table 3 refer to the exemplified compounds of (C-1) to (C-7) of a polymerizable monomers described above.

Further, a sensitizer A3 and a co-sensitizer F3 shown in Table3 are the same as those described above.

Example 3-10

The compounds for the composition U-1 described below were mixed and dissolved to form a colorant (pigment)-containing polymerizable composition U-1.

<Composition U-1>

| | |
|---|---|
| (E) Solvent: Ethyl 3-ethoxypropionate | 17.9 parts by mass |
| (B) Colorant: A dispersion liquid of C.I. Pigment Red 254 (Solid content: 15% by mass, the pigment content in the solids: 60%) | 26.7 parts by mass |
| (B) Colorant: A dispersion liquid of C.I. Pigment Yellow 139 (solid content: 15% by mass, the pigment content in the solids: 60%) | 17.8 parts by mass |
| (C) Polymerizable monomer (a mixture of pentaerythritol triacrylate and dipentaerythritol hexaacrylate (3:7)) | 3.5 parts by mass |
| (A) Specific oxime compound: Exemplified Compound (A-1) | 0.5 parts by mass |
| (D) Benzyl methacrylate/methacrylic acid copolymer | 2.0 parts by mass |

Examples 3-11 to 3-18 and Comparative Examples 3-5 to 3-8

Polymerizable compositions U-2 to U-11 and U"-1 to U"-4 were prepared exactly in the same manner as in Example 3-10, except that, in the composition U-1 used in the preparation of the polymerizable composition U-1, "(A) Specific oxime compound: Exemplified Compound (A-1) 0.5 parts by mass" was changed to "each of compounds and amounts shown in Table 4 below", and further a sensitizer and a co-sensitizer of the type and the amount shown in Table 4 were further added in each of Examples 3-16 to 3-18.

Each of the resulting polymerizable compositions was evaluated in the same way as in Example 3-1. The results are shown in Table 4.

TABLE 4

| | | Specific oxime compound or comparative compound | | Sensitizer | | Co-sensitizer | |
|---|---|---|---|---|---|---|---|
| | Composition | kind | content (parts by mass) | kind | content (parts by mass) | kind | content (parts by mass) |
| Example 3-10 | U-1 | (A-1) | 0.5 | — | — | — | — |
| Example 3-11 | U-2 | (A-2) | 0.5 | — | — | — | — |
| Example 3-12 | U-3 | (A-5) | 0.5 | — | — | — | — |
| Example 3-13 | U-4 | (A-7) | 0.5 | — | — | — | — |
| Example 3-14 | U-5 | (A-15) | 0.5 | — | — | — | — |
| Example 3-15 | U-6 | (A-16) | 0.5 | — | — | — | — |
| Example 3-16 | U-7 | (A-20) | 0.5 | — | — | — | — |
| Example 3-17 | U-8 | (A-25) | 0.5 | — | — | — | — |
| Example 3-18 | U-9 | (A-31) | 0.3 | A1 | 0.1 | F2 | 0.1 |
| Example 3-19 | U-10 | (A-33) | 0.3 | A3 | 0.1 | F2 | 0.1 |
| Example 3-20 | U-11 | (A-36) | 0.3 | A3 | 0.1 | F3 | 0.1 |
| Comparative Example 3-5 | U'-1 | comparative compound1 | 0.5 | — | — | — | — |
| Comparative Example 3-6 | U'-2 | comparative compound2 | 0.5 | — | — | — | — |
| Comparative Example 3-7 | U'-3 | comparative compound3 | 0.5 | — | — | — | — |
| Comparative Example 3-8 | U'-4 | comparative compound4 | 0.5 | — | — | — | — |

| | Storage stability | Exposure sensitivity (mJ/cm$^2$) | Pattern size (μm) | Developing property | Staining due to heating with time | Adhesion to substrate | Pattern shape |
|---|---|---|---|---|---|---|---|
| Example 3-10 | ○ | 800 | 1.96 | ○ | ○ | ○ | *1 |
| Example 3-11 | ○ | 900 | 1.95 | ○ | ○ | ○ | *1 |
| Example 3-12 | ○ | 900 | 1.97 | ○ | ○ | ○ | *1 |
| Example 3-13 | ○ | 1000 | 1.92 | ○ | ○ | ○ | *1 |

TABLE 4-continued

| | | | | | | | |
|---|---|---|---|---|---|---|---|
| Example 3-14 | ○ | 1000 | 1.95 | ○ | ○ | ○ | *1 |
| Example 3-15 | ○ | 900 | 1.96 | ○ | ○ | ○ | *1 |
| Example 3-16 | ○ | 1000 | 1.96 | ○ | ○ | ○ | *2 |
| Example 3-17 | ○ | 900 | 1.95 | ○ | ○ | ○ | *2 |
| Example 3-18 | ○ | 800 | 1.98 | ○ | ○ | ○ | *1 |
| Example 3-19 | ○ | 500 | 1.96 | ○ | ○ | ○ | *1 |
| Example 3-20 | ○ | 600 | 1.98 | ○ | ○ | ○ | *1 |
| Comparative Example 3-5 | ○ | 1500 | 1.92 | ○ | X | ○ | *3 |
| Comparative Example 3-6 | ○ | 1900 | 1.92 | ○ | X | ○ | *2 |
| Comparative Example 3-7 | ○ | 1700 | 1.91 | ○ | Δ | Δ | *3 |
| Comparative Example 3-8 | ○ | 2000 | 1.94 | ○ | X | ○ | *3 |

Sensitizers A1 and A3 and Co-Sensitizers F2 and F3 shown in Table 4 are the same compounds as described above.

Example 3-21

The compounds for the composition V-1 described below were mixed and dissolved to form a colorant (pigment)-containing polymerizable composition V-1.
<Composition V-1>

| | |
|---|---|
| (E) Solvent: Ethyl 3-ethoxypropionate | 17.9 parts by mass |
| (B) Colorant: a dispersion liquid of C.I. Pigment Red 254 (solids content: 15% by mass, the pigment content in the solids: 60%) | 33.34 parts by mass |
| (B) Colorant: a dispersion liquid of C.I. Pigment Yellow 139 (solids content: 15% by mass, the pigment content in the solids: 60%) | 22.23 parts by mass |
| (C) Polymerizable monomer (a mixture of pentaerythritol triacrylate and dipentaerythritol hexaacrylate (3:7)) | 2.5 parts by mass |
| (A) Spesific oxime compound: Exemplified Compound (A-1) | 0.5 parts by mass |
| Benzyl methacrylate/methacrylic acid copolymer (molar copolymerizing ratio = 70/30, Mw: 15000) | 2.0 parts by mass |

Examples 3-22 to 3-28 and Comparative Examples 3-9 to 3-12

Polymerizable compositions V-2 to V-8 and V'-1 to V'-4 were prepared exactly in the same manner as in Example 3-21, except that, in the composition V-1 used in the preparation of the polymerizable composition V-1, "(A) Spesific oxime compound: Exemplified Compound (A-1)" was changed to "each compound shown in Table 13 below".

Each of the resulting polymerizable compositions was evaluated in the same way as in Example 3-1. The results are shown in Table5.

TABLE 5

| | Composition | Specific oxime compound or Comparative compound | | Storage stability | Exposure sensitivity (mJ/cm²) | Pattern size (μm) | Developing property | Staining due to heating with time | Adhesion to substrate | Pattern shape |
|---|---|---|---|---|---|---|---|---|---|---|
| | | kind | content (parts by mass) | | | | | | | |
| Example 3-21 | V-1 | (A-1) | 0.5 | ○ | 1100 | 1.96 | ○ | ○ | ○ | Forward taper |
| Example 3-22 | V-2 | (A-2) | 0.5 | ○ | 1400 | 1.95 | ○ | ○ | ○ | Forward taper |
| Example 3-23 | V-3 | (A-5) | 0.5 | ○ | 1200 | 1.97 | ○ | ○ | ○ | Rectangle |
| Example 3-24 | V-4 | (A-7) | 0.5 | ○ | 1100 | 1.92 | ○ | ○ | ○ | Forward taper |
| Example 3-25 | V-5 | (A-23) | 0.5 | ○ | 1000 | 1.95 | ○ | ○ | ○ | Rectangle |
| Example 3-26 | V-6 | (A-30) | 0.5 | ○ | 1400 | 1.96 | ○ | ○ | ○ | Forward taper |
| Example 3-27 | V-7 | (A-34) | 0.5 | ○ | 1500 | 1.96 | ○ | ○ | ○ | Forward taper |
| Example 3-28 | V-8 | (A-35) | 0.5 | ○ | 1300 | 1.95 | ○ | ○ | ○ | Forward taper |
| Comparative Example 3-9 | V'-1 | Comparative compound1 | 0.5 | ○ | 3000 | 1.92 | ○ | X | ○ | Inverse taper |
| Comparative Example 3-10 | V'-2 | Comparative compound2 | 0.5 | ○ | 3500 | 1.92 | ○ | X | X | Rectangle |
| Comparative Example 3-11 | V'-3 | Comparative compound3 | 0.5 | ○ | 4200 | 1.91 | ○ | Δ | Δ | Inverse taper |
| Comparative Example 3-12 | V'-4 | Comparative compound4 | 0.5 | ○ | 2900 | 1.94 | ○ | X | ○ | Rectangle |

The results of Tables 3 to 5 indicate that the polymerizable composition of each Example containing the special oxime compound show excellent storage stability (stability over time). It is also apparent that these polymerizable compositions have high exposure sensitivity, show high developability in the process of forming colored patterns for a color filter and excellent adhesion to the substrate and with an excellent cross-sectional shape but without staining due to heating with time.

Especially, Table 5 indicates that even when the pigment content is relatively high, the composition of each Example still has high exposure sensitivity.

Example 4

<Preparation of Full-Color Color Filter>

A full-color color filter having a colored pattern obtained by using the colored polymerizable compositions for RGB colors as described below and a black matrix was prepared.

—Colored Polymerizable Composition—

The polymerizable composition T-1 of the Example 3-1 was used as a polymerizable composition for green (G).

A polymerizable composition Z-1 for blue (B) was prepared in the same manner as in the polymerizable composition T-1, except that a pigment (C.I. Acid Blue 108 and C.I. Solvent Yellow 162) was changed to a blue pigment (30/70 [mass ratio] mixture of C.I. Pigment Blue 15:6 and C.I. Pigment Violet 23).

Also, as a polymerizable composition for red (R), the polymerizable composition U-1 of Example 3-10 was used.

On a glass substrate, first, a black matrix was formed in the usual manner, on the black matrix, using the polymerizable composition T-1, a 2 μm square of a green (G) colored pattern was formed in the same manner as the method described in Example 3-1. Also, in the same manner as carried out for a green (G) polymerizable composition T-1, a 2 μm square of red (R) pattern and a 2 μm square of blue (B) pattern were sequentially formed to prepare a color filter for a solid-state imaging device.

With respect to the obtained color filter, by the same method as Example 3-1, evaluation of a colored pattern of each of R G B colors and a black matrix pattern was conducted in terms of a cross-section shape and adhesion to a substrate. It can be seen that they are all rectangular, and they are excellent in adhesion without defection of pattern.

Example 5

<Production of Solid-State Imaging Device>

A solid-state imaging device was equipped with the color filter obtained in Example 4. It is confirmed that the solid-state imaging device shows high resolution and excellent color separating property.

The invention claimed is:

1. A polymerizable composition, comprising:
a photopolymerization initiator represented by the following formula (1);
a coloring agent;
a polymerizable monomer;
a binder polymer; and
a solvent:

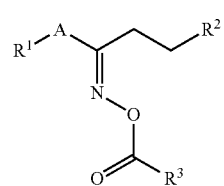

(1)

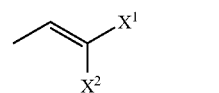

(2-1)

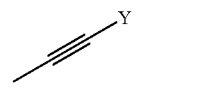

(2-2)

(2-3)

wherein, in formula (1), $R^1$ represents an aromatic group; $R^2$ represents a group represented by any one of the above Formulae (2-1) to (2-3); $R^3$ represents an alkyl group having 1 to 5 carbon atoms or an aryl group; and A represents a single bond or —C(=O)—, and wherein, in formulae (2-1) to (2-3), $X^1$, $X^2$, and Y each independently represent a hydrogen atom, an alkyl group, or an aryl group and Z represents an atomic group which may form an arbitrary ring structure containing a carbon-carbon double bond.

2. The polymerizable composition according to claim 1, wherein, in formula (1), $R^1$ is a substituent represented by the following formula (3):

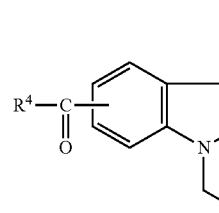

(3)

wherein, in formula (3), $R^4$ represents an aromatic group.

3. The polymerizable composition according to claim 1, wherein the coloring agent comprises a pigment or a dyestuff.

4. The polymerizable composition according to claim 3, wherein the content of the pigment or the dyestuff is in a range of from 50% by mass to 80% by mass with respect to a total solid content of the polymerizable composition.

5. The polymerizable composition according to claim 1, wherein the polymerizable monomer comprises an acidic group.

6. The polymerizable composition according to claim 1, wherein the binder polymer comprises a double bond.

7. The polymerizable composition according to claim 1, further comprising a sensitizer.

8. The polymerizable composition according to claim 7, further comprising a co-sensitizer.

9. A color filter comprising a support and, provided on or above the support, a colored pattern which has been formed using the polymerizable composition according to claim 1.

10. A solid-state imaging device equipped with the color filter according to claim 9.

11. A method for producing a color filter, the method comprising:

coating, on or above a support, the polymerizable composition according to claim 1 to form a polymerizable composition layer;

exposing the polymerizable composition layer via a mask; and developing the exposed polymerizable composition layer to form a colored pattern.

* * * * *